(12) United States Patent
Mahmoud et al.

(10) Patent No.: US 11,162,792 B2
(45) Date of Patent: Nov. 2, 2021

(54) METHOD AND SYSTEM FOR PATH-BASED POINT OF SALE ORDERING

(71) Applicant: Invensense, Incorporated, San Jose, CA (US)

(72) Inventors: Anas Mahmoud, Calgary (CA); Hussein Sahli, Calgary (CA); Da Wang, Calgary (CA); Jacques Georgy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 61 days.

(21) Appl. No.: 16/563,751

(22) Filed: Sep. 6, 2019

(65) Prior Publication Data

US 2020/0173781 A1 Jun. 4, 2020

Related U.S. Application Data

(63) Continuation of application No. 15/429,475, filed on Feb. 10, 2017, now abandoned, which is a continuation-in-part of application No. 15/167,036, filed on May 27, 2016.

(60) Provisional application No. 62/270,809, filed on Dec. 22, 2015.

(51) Int. Cl.
| | |
|---|---|
| *G01C 21/16* | (2006.01) |
| *G01C 21/20* | (2006.01) |
| *G06Q 20/20* | (2012.01) |
| *G06Q 30/06* | (2012.01) |
| *H04L 29/08* | (2006.01) |

(52) U.S. Cl.
CPC .......... *G01C 21/16* (2013.01); *G01C 21/206* (2013.01); *G06Q 20/202* (2013.01); *G06Q 30/0635* (2013.01); *G06Q 30/0639* (2013.01); *H04L 67/18* (2013.01); *G06Q 20/20* (2013.01)

(58) Field of Classification Search
CPC ...... G01C 21/16; G01C 21/206; G06Q 20/20; G06Q 30/0639; G06Q 30/0635; G06Q 20/202; H04L 67/18
See application file for complete search history.

(56) References Cited

U.S. PATENT DOCUMENTS

| | | | |
|---|---|---|---|
| 9,147,208 B1* | 9/2015 | Argue | G06Q 30/0633 |
| 9,785,993 B2* | 10/2017 | Kapicioglu | G06Q 30/0625 |
| 10,869,329 B2* | 12/2020 | Xu | H04W 52/0209 |
| 2002/0161651 A1* | 10/2002 | Godsey | G06Q 30/0237 705/22 |
| 2006/0012493 A1* | 1/2006 | Karlsson | G01C 21/12 340/995.24 |
| 2008/0165053 A1* | 7/2008 | Liu | G01S 19/32 342/357.27 |
| 2009/0224977 A1* | 9/2009 | Bonner | H04W 4/029 342/378 |

(Continued)

*Primary Examiner* — Mathew Franklin Gordon
(74) *Attorney, Agent, or Firm* — Bay Area Technology Law Group PC

(57) ABSTRACT

Anchor points associated with point of sale information may be ordered by segmenting a trajectory derived from sensor data defined by adjacent turns to generate candidate links for each segment from which possible paths for the trajectory are derived. Each derived possible path may be scored with a multi-objective function using a global optimization algorithm to select a solution path from the derived possible paths that may be used to order a plurality of anchor points.

30 Claims, 24 Drawing Sheets

(56) References Cited

U.S. PATENT DOCUMENTS

2015/0281910 A1* 10/2015 Choudhury ............. H04W 4/33
                                                                             455/456.1
2018/0007515 A1* 1/2018 Arslan .................. H04W 4/029

* cited by examiner

METHOD AND SYSTEM FOR PATH-BASED POINT OF SALE ORDERING

CROSS-REFERENCE TO RELATED APPLICATIONS

This application claims priority from and benefit of U.S. Provisional Patent Application Ser. No. 62/270,809, filed Dec. 22, 2015, which is entitled "POINTS OF SALE ANCHOR POINTS ORDERING," and is a continuation-in-part of U.S. patent application Ser. No. 15/167,036, filed May 27, 2016, which is entitled "METHOD AND SYSTEM FOR POINT OF SALE ORDERING," both of which are assigned to the assignee hereof and are incorporated by reference in their entirety.

FIELD OF THE PRESENT DISCLOSURE

The present disclosure relates to a method and system for ordering point of sale data using sensor data for a device within a platform or person, wherein the device can be strapped or non-strapped to the platform or person, and wherein in case of non-strapped mobility of the device may be constrained or unconstrained within the platform or person, and wherein the device can be tilted to any orientation.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the portable device. Notably, devices such as smartphones, tablets, smart watches or other portable devices may feature Global Navigation Satellite Systems (GNSS) receivers, low cost Micro Electro-Mechanical Systems (MEMS) inertial sensors, barometers and magnetometers. GNSS and multi-sensors can be integrated to provide promising positioning results in most outdoor environments. However, some mass market applications require seamless positioning capabilities in all kinds of environments such as malls, offices or underground parking lots. In the absence of GNSS signals in indoor environments, the conventional strapdown Inertial Navigation System (SINS) that uses low cost inertial sensors, suffers significant performance degradation due to the accumulated sensor drifts and bias. As such, positioning technologies relying solely on motion sensors may not satisfy all requirements for seamless indoor and outdoor navigation applications.

Pedestrian Dead Reckoning (PDR) is an example of a technique for indoor/outdoor positioning, and has become the focus of industrial and academic research recently. Similar to the SINS, PDR accumulates successive displacement from a known starting point to derive the position. This displacement (step length) can be estimated with various algorithms within a certain accuracy using the inertial sensor measurements. The position error using step lengths from PDR accumulates much slower than that from the accelerometer derived displacement from SINS. The PDR shows improved performance over SINS without GNSS updates. However, PDR still lacks robustness because of the accumulated heading error. Conventional methods of complementing sensor-based navigation include systems that are based on trilateration of received wireless signals, such as WiFi™ access points or dedicated beacons. As will be recognized, such methods involve considerable additional equipment and deployment overhead.

The performance of SINS and/or PDR techniques may be significantly improved if corrections are available during the positioning trajectory. For example, a source of position information that may be used to correct a sensor-based solution may be termed an "anchor point," which generally means a source of position information that is known without reference to motion sensor data. One potential resource for deriving anchor points that may be used to supplement a position solution exists when a user carries the portable device through a retail venue. By analyzing point of sale data, it may be determined which items were purchased by the user. Accordingly, each purchased item may constitute an anchor point if the absolute position of the item within the retail venue is known. Notably, each product may have a designated location on shelves or other display features within the retail venue that may be stored in a database maintained by retail venue or provided by third parties that provide store maps and product shelf databases. Other similar services may also be employed. An interaction between the user and each item purchased may be assumed, involving the user taking the item from its shelf location in association with buying it, indicating the user was at the location corresponding to the item's position in the retail venue.

The point of sale information does not inherently determine the order or the time the user was positioned at the anchor points. Without ordering information, the anchor points may be used to reject possible routes indicated by the motion sensor data. However, it may not be possible to directly integrate the location information associated with such anchor points with the sensor-based navigation. By employing the techniques of this disclosure, anchor points from point of sale information may be ordered and/or time-correlated with a trajectory of the user derived from motion sensor data.

SUMMARY

As will be described in detail below, this disclosure includes a method for ordering a plurality of anchor points based at least in part on a navigation solution from a portable device. The method may involve obtaining sensor data for the portable device representing motion of the portable device at a plurality of epochs over a first period of time, deriving a trajectory for the portable device for the first period of time, obtaining a map of a venue encompassing the trajectory, obtaining a plurality of anchor points associated with the trajectory, associating known positions of the plurality of anchor points with the map, characterizing turns of the trajectory, representing the trajectory as a set of connected segments, such that each segment is defined by adjacent turns, generating candidate links for each segment by comparing each segment to the map, deriving possible paths for the trajectory from the candidate links, scoring each derived possible path with a multi-objective function, selecting a solution path from the derived possible paths based at least in part on the scores and ordering the plurality of anchor points based at least in part on the solution path.

This disclosure also includes a system for ordering a plurality of anchor points that may include a portable device comprising an integrated sensor assembly, configured to output sensor data representing motion of the portable device for the portable device at a plurality of epochs over a first period of time, and a communications module for transmitting information corresponding to the epochs, and remote processing resources configured to receive the information from the portable device and having a processor configured to implement an ordering module to obtain a map of a venue encompassing a trajectory derived for the portable device for the first period of time, obtain a plurality of anchor points associated with the trajectory, associate known positions of the plurality of anchor points with the map, characterize turns of the trajectory, represent the trajectory as a set of connected segments, such that each segment is defined by adjacent turns, generate candidate links for each segment by comparing each segment to the map, derive possible paths for the trajectory from the candidate links, score each derived possible path with a multi-objective function, select a solution path from the derived possible paths based at least in part on the scores and order the plurality of anchor points based at least in part on the solution path.

This disclosure also includes a remote processing resource for ordering a plurality of anchor points, the remote processing resource configured to implement an ordering module to obtain a map of a venue encompassing a trajectory derived for a portable device from sensor data representing motion of the portable device at a plurality of epochs over a first period of time, wherein the mobility of the portable device is constrained or unconstrained within a platform and wherein the portable device may be tilted to any orientation, obtain a plurality of anchor points associated with the trajectory, associate known positions of the plurality of anchor points with the map, characterize turns of the trajectory, represent the trajectory as a set of connected segments, such that each segment is defined by adjacent turns, generate candidate links for each segment by comparing each segment to the map, derive possible paths for the trajectory from the candidate links, score each derived possible path with a multi-objective function, select a solution path from the derived possible paths based at least in part on the scores and order the plurality of anchor points based at least in part on the solution path.

This disclosure also includes a portable device for ordering a plurality of anchor points comprising an integrated sensor assembly, configured to output sensor data representing motion of the portable device for the portable device at a plurality of epochs over a first period of time, wherein the mobility of the portable device is constrained or unconstrained within a platform and wherein the portable device may be tilted to any orientation, and a communications module for transmitting information corresponding to the epochs and a navigation module configured to derive a trajectory for the portable device for the first period of time based at least in part on the sensor data, obtain a map of a venue encompassing a trajectory derived for the portable device for the first period of time, obtain a plurality of anchor points associated with the trajectory, associate known positions of the plurality of anchor points with the map, characterize turns of the trajectory, represent the trajectory as a set of connected segments, such that each segment is defined by adjacent turns, generate candidate links for each segment by comparing each segment to the map, derive possible paths for the trajectory from the candidate links, score each derived possible path with a multi-objective function, select a solution path from the derived possible paths based at least in part on the scores and order the plurality of anchor points based at least in part on the solution path.

DETAILED DESCRIPTION

Figure 1:
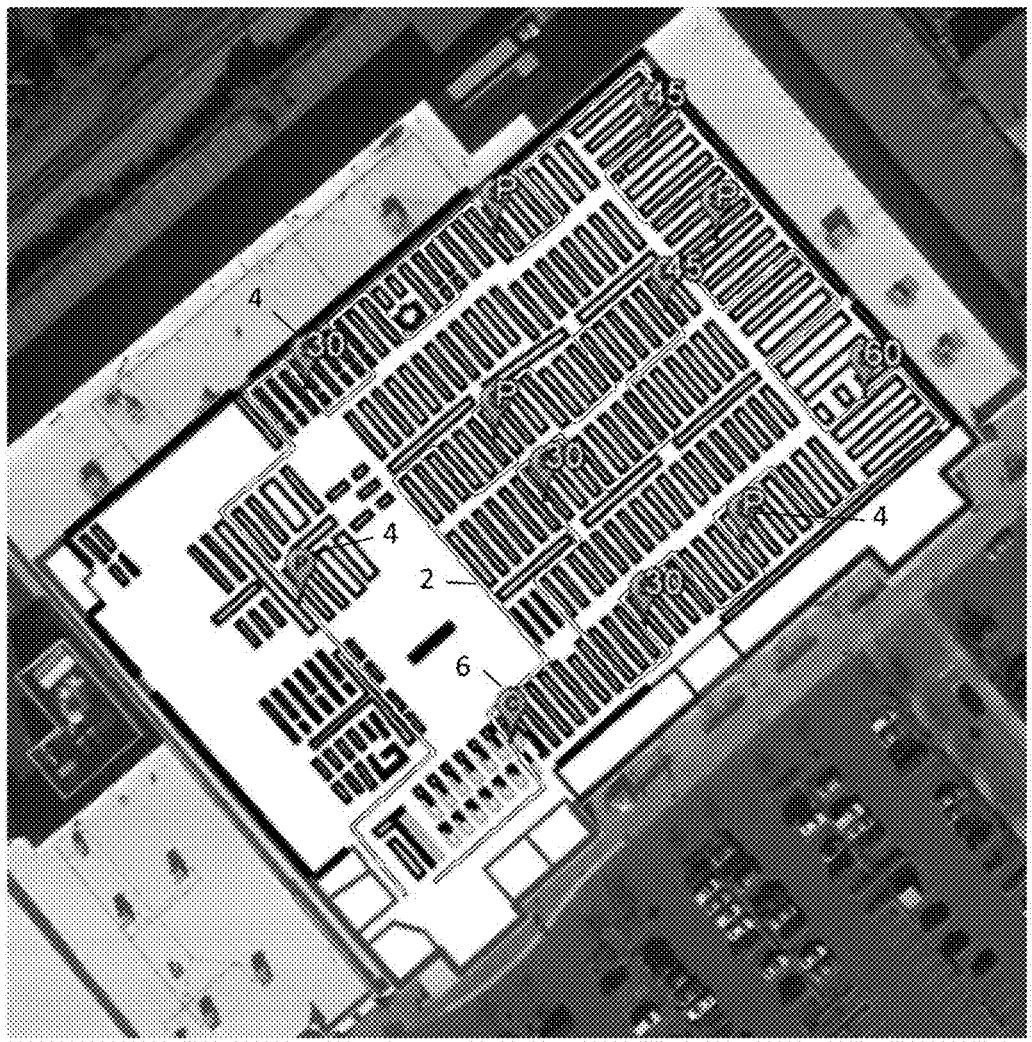
FIG. 1 is a schematic diagram of a retail venue having anchor points determined from point of sale information according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The techniques of this disclosure are directed to navigation solutions for a portable device that may be associated with a platform that transports the device. The platform may be the user, as in the example of a smartphone being carried as a user walks, runs, or otherwise undergoes locomotion. The platform may also be considered a vehicle or vessel that conveys the user and/or the portable device, such as a wheelchair. In some embodiments, the platform may be a shopping cart or other aid associated with retail transactions. To illustrate, the portable device may be incorporated into the shopping cart itself or may be carried in the shopping cart, either loose or contained within another carrier, such as a purse or the like. In some other embodiments, the platform may be a stroller or something of the like that the user put their portable device in. Although the portable device generally maybe transported or conveyed in the direction of movement of the platform, its orientation may not be constrained. Returning to the example of the smartphone, it may be held in the user's hand and employed in a variety of orientations or carried in a pocket, holster, bag or other manners. In other examples, the portable device may be strapped to the platform, such as with a mount, or may be non-strapped. When non-strapped, the mobility of the device may be constrained or unconstrained within the platform and as a result, circumstances may exist such that the device can be tilted to any orientation with respect to the user or platform.

As an illustration only and without limitation, a user may be carrying a portable device while traversing a venue, such as shopping within a store. During this time, the portable device may derive a navigation solution comprising information about the position, orientation and or movement of the portable device of multiple epochs, thereby representing the trajectory of the user through the store. The trajectory may represent the motion of the portable device through a venue between boundary points, such as a start and an end of the trajectory. In one aspect, the portable device may use any suitable real-time technique to generate such navigation solution, including an inertial navigation routine employing dead reckoning, a reference-based location service utilizing a source of absolute navigation information, a location beaconing system or any other suitable technique, or combinations thereof. Although of substantial benefit, these real-time solution may nonetheless suffer from inaccuracies or limitations. Again without limitation, an inertial dead reckoning system may be subject to drift over time due to the characteristics of currently-employed sensors or a source of absolute navigation information such as a global navigation satellite system (GNSS) may suffer from poor reception in indoor environments. Accordingly, the techniques of this disclosure are directed to the ordering of a plurality of anchor points derived from point of sale information. Once ordered, the anchor points may be used as absolute information or as an absolute position update to a sensor-based navigation solution or to a map-matching solution. Ordered anchor points may also be used to suggest possible routes of the trajectory or to segment the trajectory into more manageable portions between known positions established by the anchor points. The anchor points may also be time-tagged and their known position can be correlated with positions derived from the motion sensor data. Furthermore, some aspects of this disclosure also relate to assessing the certainty or uncertainty of determinations made regarding navigation solutions and/or anchor point ordering. It will be appreciated that with regard to a certainty measure, the value may increase in relation to confidence in the accuracy of a determination, while the value of an uncertainty measure may decrease. Conversely, the value of an uncertainty measure may increase in relation to ambiguity in a determination, while the value of a certainty measure may decrease. As such, certainty and uncertainty have a generally reciprocal relationship and either may be used to evaluate the accuracy of a given determination as desired or warranted by the context.

As one illustrative example, a user associated with a portable device that provides motion sensor data may follow a trajectory through a retail venue, as schematically indicated in FIG. 1. The actual trajectory of the user is represented by outline track 2 and the location of each unordered point of sale anchor point is designated by pins 4. When the user purchases items at the retail venue, a receipt is generated that indicates the products that were bought. As noted above, the location of each item within the retail venue may be obtained from the retailer or from a third party. Thus, the location of each item purchased may have a known location (e.g. Cartesian coordinates) as indicated by pins 4. In some embodiments, one or more anchor points, such as pin 6, may be inherently ordered. Here, pin 6 corresponds to the register at which the user checked out and purchased the items selected over the course of the trajectory. Accordingly, it may be assumed that the checkout is the last anchor point. However, the point of sale information may not provide any inherent information about the order in which the anchor points represented by pins 4 were visited. By employing the techniques of this disclosure, the anchor points represented by pins 4 may be ordered.

Figure 2:
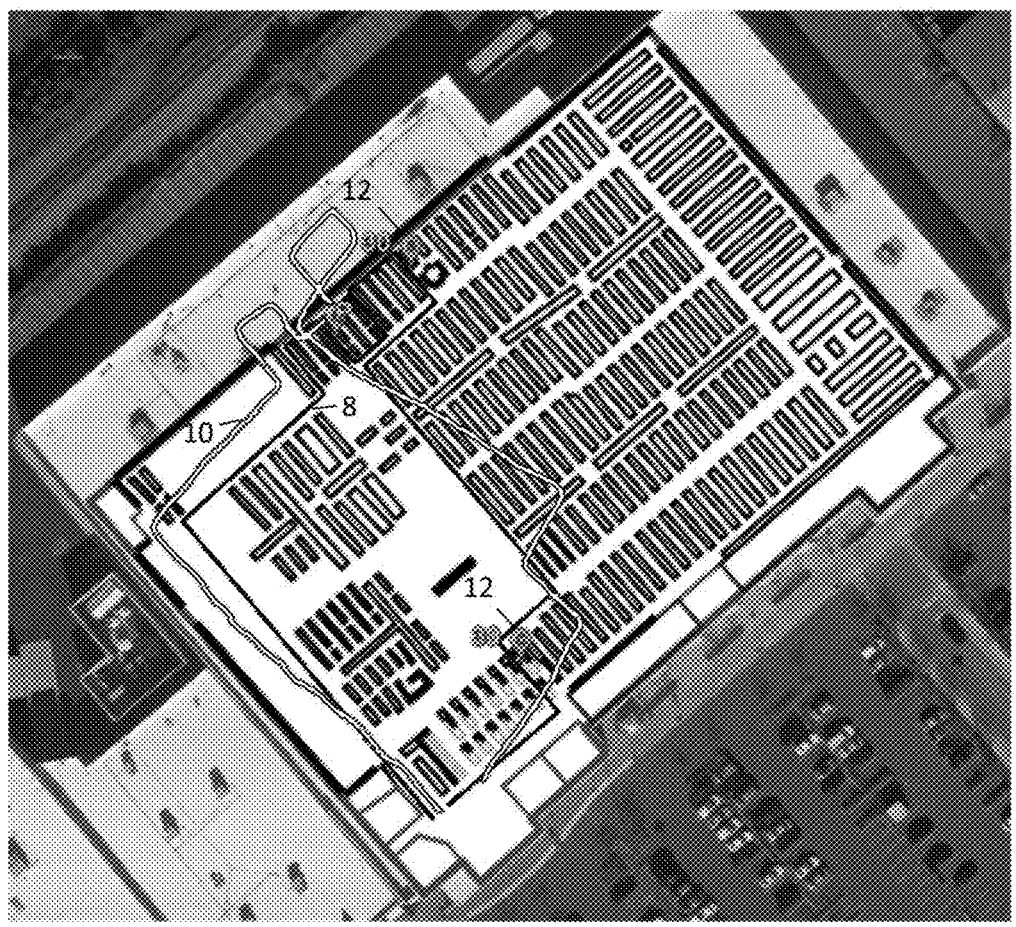
FIG. 2 is a schematic diagram of a trajectory of a user derived from motion sensor data in a retail venue according to an embodiment.

Although navigation solutions for a portable device may drift over time as discussed above, the overall shape of the trajectory may have sufficient characteristics to allow it to compared to candidate paths representing possible routes through a venue. Correspondingly, a solution path may be selected from the candidate paths that appropriately incorporates any anchor points that are available for the trajectory. This aspect is illustrated in FIG. 2, which shows the reference trajectory of a user as black line track 8. The trajectory derived from motion sensor data is shown as outline track 10. While the absolute position indicated by the derived trajectory may be seen to drift, the shape of track 10 may be matched to track 8 and distinguish other possible routes that could have been taken. Upon selecting a solution path that corresponds to the actual route, any anchor points identified on the map, such as those indicated by pins 12, may be ordered by using the solution path.

Figure 3:
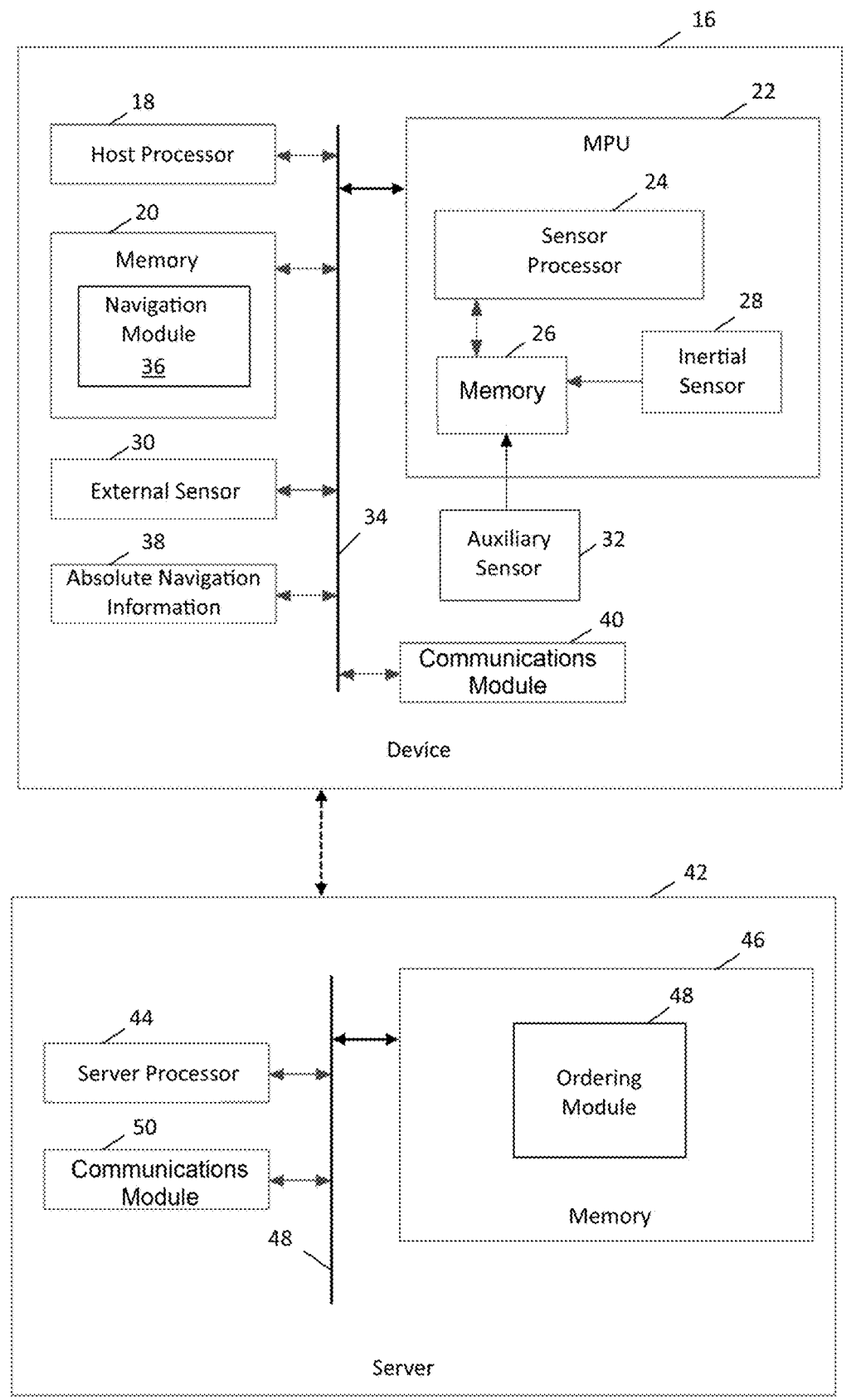
FIG. 3 is a schematic representation of functional blocks of a system for ordering anchor points according to an embodiment.

One representative system for ordering anchor points is schematically depicted in FIG. 3, with portable device 16 represented by high level schematic blocks. As will be appreciated, device 16 may be implemented as a device or apparatus, such as a handheld device that can be moved in space by a user and its motion, location and/or orientation in space therefore sensed. For example, such a handheld device may be a mobile phone (e.g., smartphone, cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 16 includes a host processor 18, which may be one or more microprocessors, central processing units (CPUs), or other processors to run software programs, which may be stored in memory 20, associated with the functions of device 16. Multiple layers of software can be provided in memory 20, which may be any combination of computer readable medium such as electronic memory or other storage medium such as hard disk, optical disk, etc., for use with the host processor 18. For example, an operating system layer can be provided for device 16 to control and manage system resources in real time, enable functions of application software and other layers, and interface application programs with other software and functions of device 16. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 16, and in some of those embodiments, multiple applications can run simultaneously.

Device 16 includes at least one sensor assembly, as shown here in the form of integrated motion processing unit (MPU™) 22 featuring sensor processor 24, memory 26 and inertial sensor 28. Memory 26 may store algorithms, routines or other instructions for processing data output by inertial sensor 28 and/or other sensors as described below using logic or controllers of sensor processor 24, as well as storing raw data and/or motion data output by inertial sensor 28 or other sensors. Inertial sensor 28 may be one or more sensors for measuring motion of device 16 in space. Depending on the configuration, MPU 22 measures one or more axes of rotation and/or one or more axes of acceleration of the device. In one embodiment, inertial sensor 28 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 24, or other processing resources of device 16, combines data from inertial sensor 28 to provide a six axis determination of motion. As desired, inertial sensor 28 may be implemented using Micro Electro Mechanical System (MEMS) to be integrated with MPU 22 in a single package. Exemplary details regarding suitable configurations of host processor 18 and MPU 22 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for MPU 22 in device 16 are available from InvenSense, Inc. of Sunnyvale, Calif. In other embodiments, a sensor processing unit (SPU) may be employed instead of an MPU.

Alternatively or in addition, device 16 may implement a sensor assembly in the form of external sensor 30. This is optional and not required in all embodiments. External sensor may represent one or more sensors as described above, such as an accelerometer and/or a gyroscope, which output data for use in deriving a navigation solution. As used herein, "external" means a sensor that is not integrated with MPU 22 and may be remote or local to device 16. Also alternatively or in addition, MPU 22 may receive data from an auxiliary sensor 32 configured to measure one or more aspects about the environment surrounding device 16. This is optional and not required in all embodiments. For example, a barometer and/or a magnetometer may be used to refine position determinations made using inertial sensor 28. In one embodiment, auxiliary sensor 32 may include a magnetometer measuring along three orthogonal axes and output data to be fused with the gyroscope and accelerometer inertial sensor data to provide a nine axis determination of motion. In another embodiment, auxiliary sensor 32 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 18, memory 20, MPU 22 and other components of device 16 may be coupled through bus 34, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 16, such as by using a dedicated bus between host processor 18 and memory 20.

In one aspect, the various operations of this disclosure used to derive a navigation solution for portable device 16 may be implemented through navigation module 36 as a set of suitable instructions stored in memory 20 that may be read and executed by host processor 18. Navigation module 36 may employ a reference-based strategy, a self-contained strategy, or any combination of strategies to provide any desired degree of location awareness capabilities. For example, navigation module 36 may employ inertial navigation techniques utilizing sensor data, such as from inertial sensor 28, external sensor 30 and/or auxiliary sensor 32, as obtained for a current sensor epoch to derive a navigation solution for that epoch. Such techniques may involve dead reckoning or the like, and may determine an orientation for device 16, including values such as any roll, pitch, and azimuth (heading) angles. The navigation solutions derived by navigation module 36 represent contemporaneous determinations of position information for portable device 16. Although some transmission, some possible buffering, and processing time may be required, the results are at least near real time (there could be some possible latencies) and may use any information available up until the time the navigation solution is derived. Still further, navigation module 36 may also be configured to determine a motion mode that indicates the user's motion patterns, which may include without limitation, walking, driving, running, going up/down stairs, riding an elevator, walking/standing on an escalator, and other similar motion patterns. In some embodiments, navigation module 36 may employ a real-time map matching routine to aid the derivation of navigation solutions in a causal manner.

Navigation module 36 may also use a source of absolute navigation information 38, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments. Navigation module 36 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Further, portable device 16 may also have a communications module 40 for transmitting and/or receiving information, including navigation solutions derived by navigation module 36.

Multiple layers of software may be employed as desired and stored in any combination of memory 20, memory 26, or other suitable location. For example, a motion algorithm layer can provide motion algorithms that provide lower-level processing for raw sensor data provided from the motion sensors and other sensors. A sensor device driver layer may provide a software interface to the hardware sensors of device 16. Further, a suitable application program interface (API) may be provided to facilitate communication between host processor 18 and MPU 22, for example, to transmit desired sensor processing tasks.

In this exemplary system, portable device 16 communicates raw sensor data or navigation solutions derived for a plurality of sensor epochs over a first period of time to server 42. Subsequent to the first period of time, server 42 may then receive anchor points associated with point of sale information and utilize the techniques of this disclosure to order the anchor points, based at least in part on a trajectory determined for portable device 16, either as determined by navigation module 36 or by server 42 as described below. Notably, in embodiments where portable device 16 transmits raw sensor data to server 42, navigation module 36 may be optional as no position determination need be made locally. One suitable architecture of server 42 is depicted using high level schematic blocks in FIG. 3, and may include server processor 44 that is in communication with memory 46 over bus 48. As will be described in further detail below, server processor 44 may execute instructions stored in memory 46 that are represented as functional blocks, including ordering module 48, which may perform the operations described in this disclosure to order anchor points by shape matching a trajectory to map information.

Server 42 may also include a communications module 50 to receive raw sensor data or navigation solutions for portable device 16 derived by navigation module 36. Communications module 50 may also receive point of sale information, such as items purchased by the user and the corresponding location of those items in the retail venue. Communications involving portable device 16 and server 42 may employ any suitable protocol. For example, a shorter range, low power communication protocol such as BLUETOOTH®, ZigBee®, ANT or a wired connection may be used or a longer range communication protocol, such as a transmission control protocol, internet protocol (TCP/IP) packet-based communication, accessed using a wireless local area network (WLAN), cell phone protocol or the like may be used. In general, the system depicted in FIG. 3 may embody aspects of a networked or distributed computing environment. Portable device 16 and server 42 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As noted, portable device 16 may derive navigation solutions and server 42 may obtain anchor points from point of sale information and order those anchor points. However, any or all of the functions described as being performed may be performed by any number of discrete devices in communication with each other, or may be performed by portable device 16 itself in other suitable system architectures. For example, navigation module 36 may be configured to obtain anchor points from point of sale information and order those anchor points by performing the functions associated with ordering module 48. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 18, sensor processor 24, server processor 44, a dedicated processor or any other processing resources of portable device 16, server 42 or other remote processing resources, or may be implemented using any desired combination of software, hardware and firmware.

Figure 27:
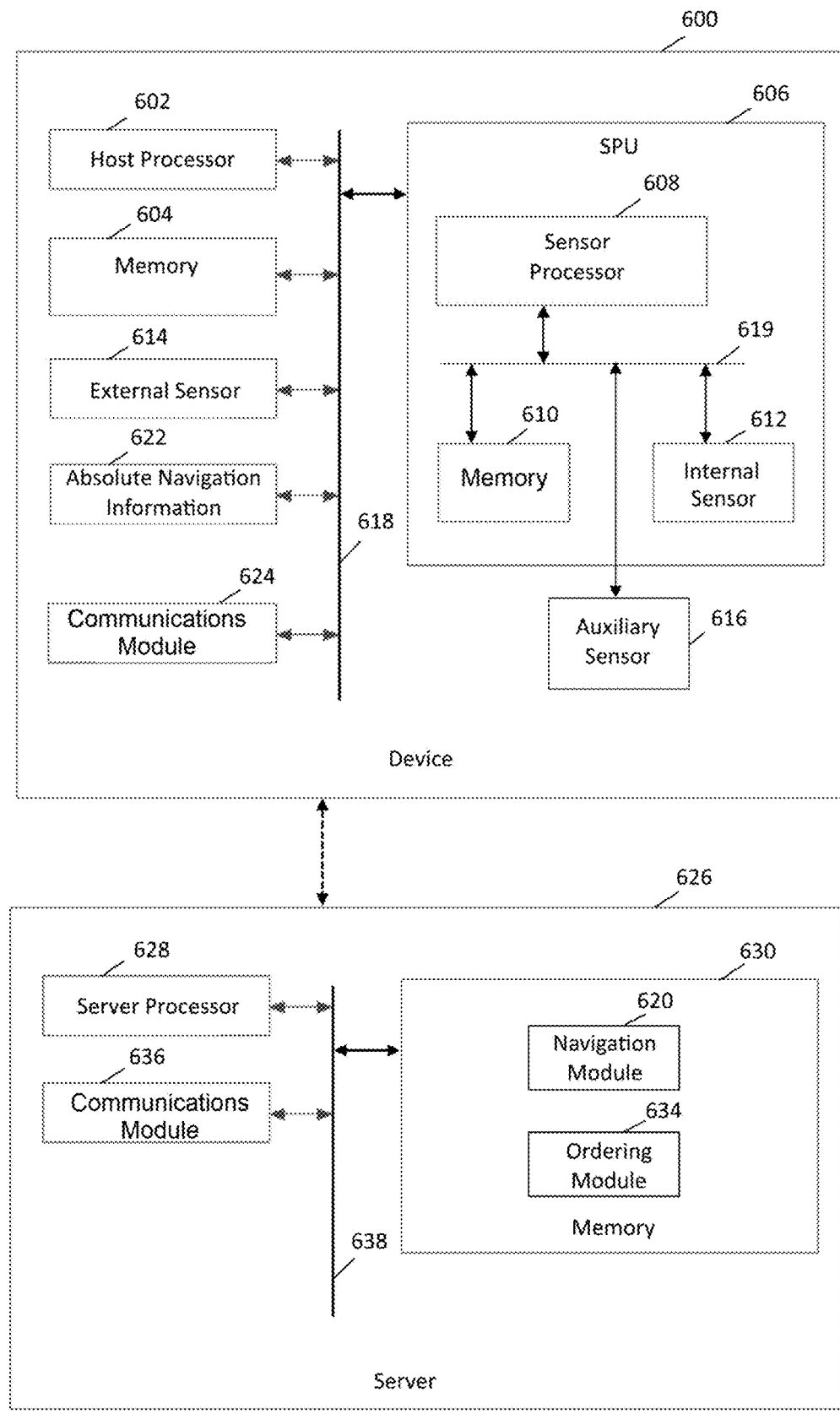
FIG. 27 is schematic diagram of another system for ordering anchor points according to an embodiment.

Within this disclosure, reference may be made to the embodiment of FIG. 3 for the sake of convenience, however, it should be appreciated that many other architectures and system configurations may be employed. Thus, the techniques may be adapted to these and other embodiments as will be recognized by one of ordinary skill in the art. For example, another embodiment is schematically depicted in FIG. 27. Here, similar components have corresponding reference numbers (such as, portable device 100 of FIG. 3 may correspond to portable device 600 of FIG. 6). As such, portable device 600 includes a host processor 602, which may be one or more microprocessors, central processing units (CPUs), or other processors to run software programs, which may be stored in memory 604, associated with the functions of device 600. Multiple layers of software can be provided in memory 604. Device 600 includes at least one sensor assembly, as shown here in the form of integrated sensor processing unit (SPU) 606 featuring sensor processor 608, memory 610 and inertial sensor 612. Memory 610 may store algorithms, routines or other instructions for processing data output by inertial sensor 612 and/or other sensors as described below using logic or controllers of sensor processor 608, as well as storing raw data and/or motion data output by inertial sensor 612 or other sensors. Inertial sensor 612 may be one or more sensors for measuring motion of device 600 in space, such as a gyroscope and/or an accelerometer as described above. Device 600 may also implement a sensor assembly in the form of external sensor 614. This is optional and not required in all embodiments. Also alternatively or in addition, SPU 606 may receive data from an auxiliary sensor 616 configured to measure one or more aspects about the environment surrounding device 600. This is optional and not required in all embodiments. In this embodiment, host processor 602, memory 604, SPU 606 and other components of device 600 may be coupled through bus 618, while sensor processor 608, memory 610, internal sensor 612 and/or auxiliary sensor 616 may be coupled though bus 619, either of which may be any suitable bus or interface as noted above. Device 600 may also have a source of absolute navigation information 622, which is optional, and may have a communications module 624 for transmitting and/or receiving information, including solution paths derived remotely.

In this exemplary system, portable device 600 communicates raw sensor data for a plurality of sensor epochs over a first period of time to server 626, which may include a navigation module 620 to derive a navigation solution for portable device 600 for the raw sensor data at each epoch. Navigation module 620 may be implemented as a set of suitable instructions stored in memory 630 that may be read and executed by server processor 628. As noted above, the navigation solutions may include any position, velocity and/or attitude information for the plurality of epochs. The navigation solutions may be used to derive a complete trajectory for device 600 from the first position to the second position. Subsequent to the first period of time, server 626 may then assign orders to a plurality of anchor points with ordering module 634 accroding to the techniques of this disclosure. Server 626 may also include a communications module 636 to receive raw sensor data for portable device 600, and if desired, to transmit information related to the anchor point ordering to portable device 600 or to another destination. The components of server 626 may be interconnected via bus 638, although other architectures may be employed as desired.

Figure 7:
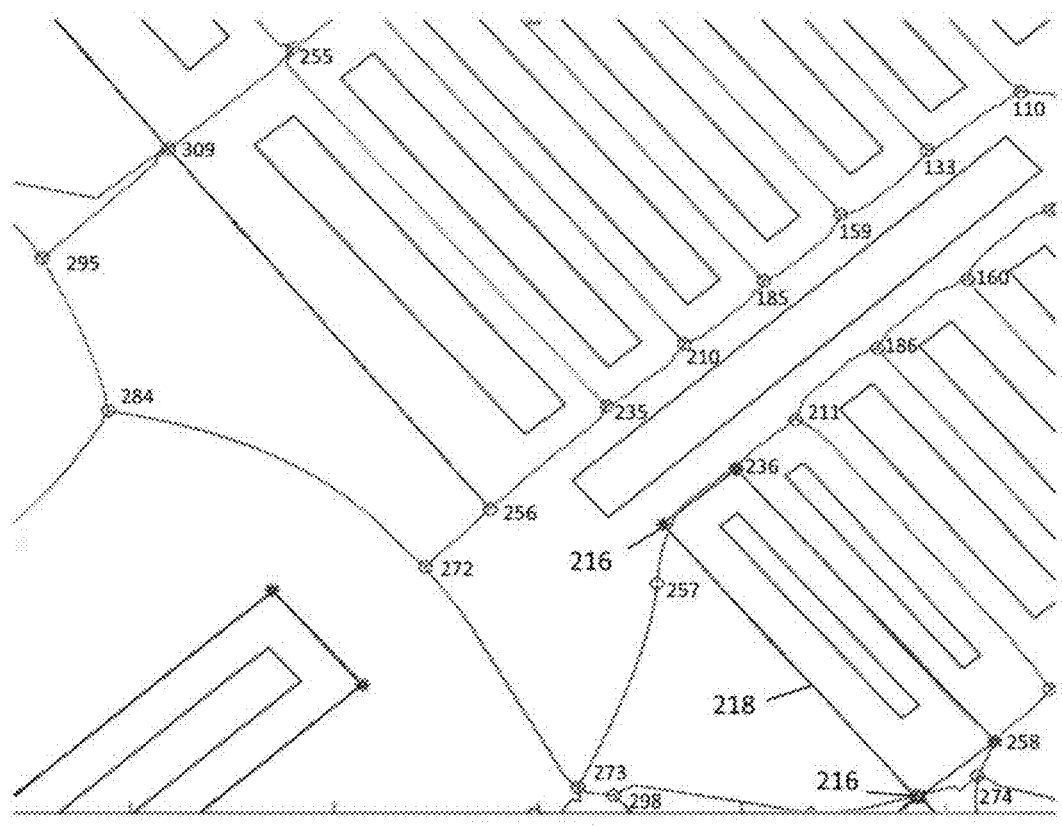
FIG. 7 is a schematic representation of grid map having supplemental nodes and traces according to an embodiment.
Figure 28:
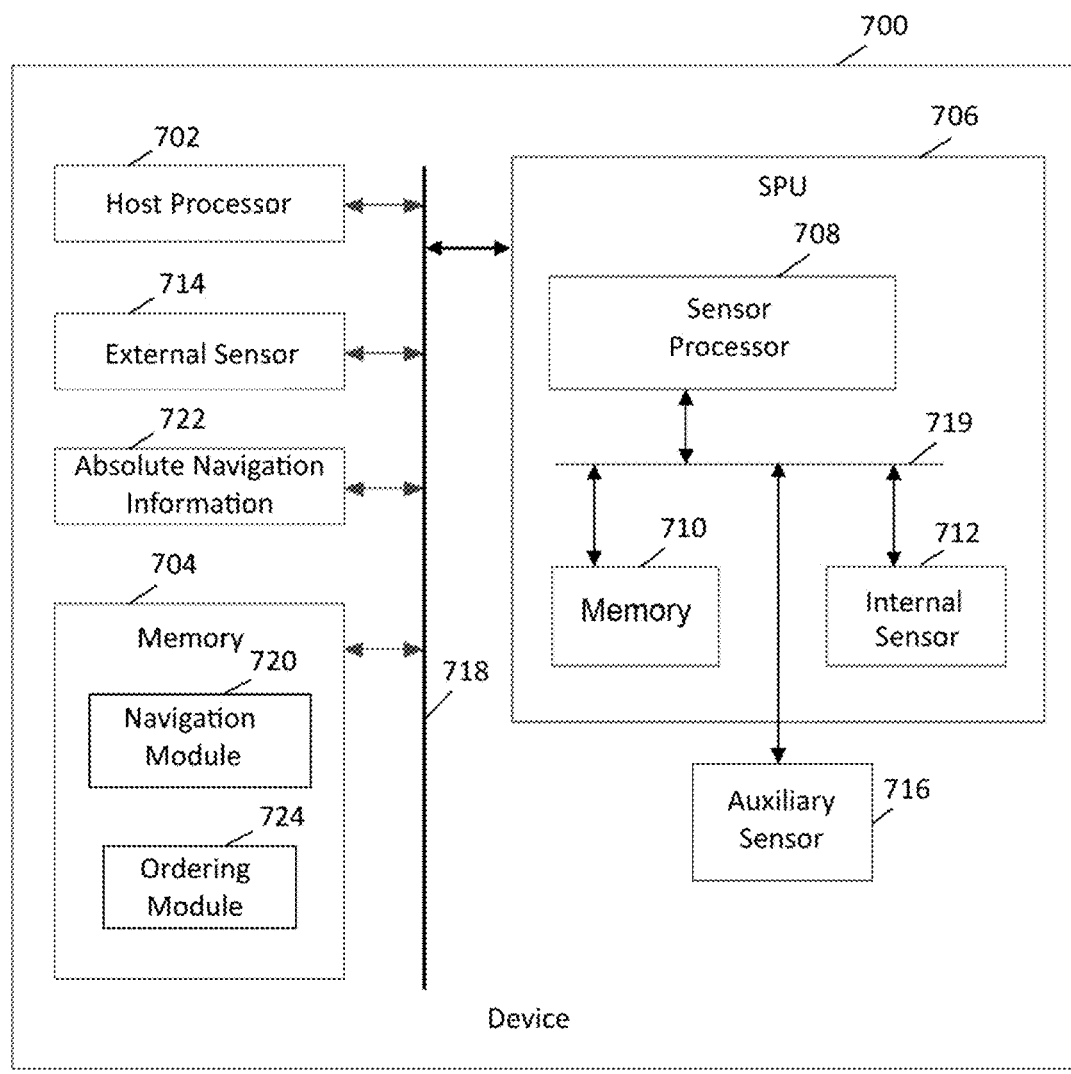
FIG. 28 is schematic diagram of a device for ordering anchor points according to an embodiment.

As another illustrative example, the embodiment schematically depicted in FIG. 7 represents a device in which the global shape matching routine is performed locally. Again, similar components have corresponding reference numbers (such as, portable device 100 of FIG. 3 may correspond to portable device 700 of FIG. 28). Accordingly, portable device 700 includes a host processor 702, which may be one or more microprocessors, central processing units (CPUs), or other processors to run software programs, which may be stored in memory 704, associated with the functions of device 700. Multiple layers of software can be provided in memory 704. Device 700 includes at least one sensor assembly, as shown here in the form of integrated motion processing unit (SPU) 706 featuring sensor processor 708, memory 710 and inertial sensor 712. Memory 710 may store algorithms, routines or other instructions for processing data output by inertial sensor 712 and/or other sensors as described below using logic or controllers of sensor processor 708, as well as storing raw data and/or motion data output by inertial sensor 712 or other sensors. Inertial sensor 712 may be one or more sensors for measuring motion of device 700 in space, such as a gyroscope and/or an accelerometer as described above. Device 700 may also implement a sensor assembly in the form of external sensor 714. This is optional and not required in all embodiments. Also alternatively or in addition, SPU 706 may receive data from an auxiliary sensor 716 configured to measure one or more aspects about the environment surrounding device 700. This is optional and not required in all embodiments. In the embodiment shown, host processor 702, memory 704, SPU 706 and other components of device 700 may be coupled through bus 718, while sensor processor 708, memory 710, internal sensor 712 and/or auxiliary sensor 716 may be coupled though bus 719, either of which may be any suitable bus or interface. Device 700 may also have a source of absolute navigation information 722, which is optional and not required in all embodiments. In this embodiment, portable device 700 includes navigation module 720, representing instructions stored in memory 704 for execution by host processor 702 to derive a navigation solution for portable device 700 using the sensor data at each epoch. Subsequent to the first period of time, device 700 may order anchor points according to the techniques of this disclosure with ordering module 724, such as by using the navigation solutions from navigation module 720.

Figure 4:
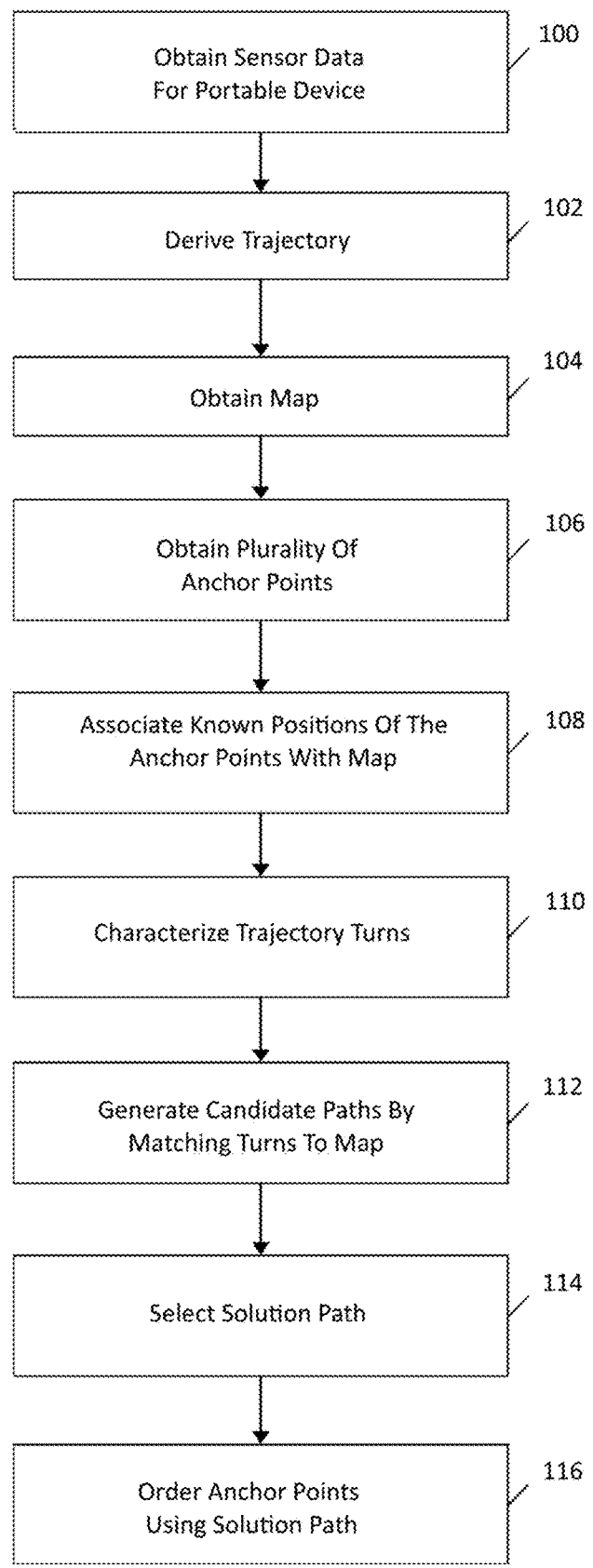
FIG. 4 is a schematic representation of routine for ordering anchor points according to an embodiment.

A representative routine involving the techniques of this disclosure is depicted in FIG. 4. Beginning with 100, sensor data may be obtained for a plurality of epochs over a given time period, such as from inertial sensor 28 and/or external sensor 30, for the portable device 16. Using the sensor data, navigation module 36 may derive navigation solutions at each sensor epoch to derive a trajectory in 102. Alternatively, the raw sensor data, the derived navigation solutions or both may be transmitted to remote processing resources, such as server 42. For example, the derivation of navigation solutions for each sensor epoch may be performed by navigation module 36 at portable device 16 or may be performed at server 42 using the raw sensor data for each sensor epoch as transmitted by portable device 16. A map may be obtained for a venue encompassing the trajectory in 104. As will be described below, the map may be a grid map, a geometric map or a combination. Map information may also be processed or transformed into a suitable grid and/or geometric map as warranted. In 106, a plurality of anchor points associated with the trajectory may be obtained by ordering module 48, such as from point of sale information as noted. Known positions of the plurality of anchor points may then be associated with the map in 108. Ordering module 48 may analyze the trajectory to characterize turns in 110. Next, a plurality of candidate paths may be generated by ordering module 48 in 112 by comparing the characterized turns to the map. In 114, a solution path from the plurality of candidate paths may be selected by ordering module 48 that corresponds to the plurality of anchor points. Correspondingly, the plurality of anchor points may be ordered in 116 based at least in part on the solution path.

In one aspect, characterizing turns of the trajectory may involve identifying pairs of sequential turns and a distance traveled between each pair of sequential turns. Each turn may include a start and an end and the distance traveled between a pair of sequential turns may be a distance between the end of a first turn and the start of a subsequent turn. The distance traveled between a pair of sequential turns may be determined based at least in part on step length.

In one aspect, characterizing turns of the trajectory may also involve determining a link for each pair of sequential turns, wherein the link comprises a portion of the trajectory having the distance traveled between the pair of sequential turns and a heading.

In one aspect, a turn may be identified based at least in part on a rate of heading change of the portable device exceeding a threshold. Heading information may be filtered before identifying a turn.

In one aspect, the start of the turn may be determined when the rate of heading change exceeds the threshold and the end of the turn may be determined when the rate of heading change falls below the threshold.

In one aspect, identifying a turn may be based at least in part on a detected fidgeting period and a change of heading during the fidgeting period. The start of the turn may be determined when the fidgeting period begins and the end of the turn may be determined when the fidgeting period ends.

In one aspect, identifying a turn may be based at least in part on characterizing an intersection between adjacent trajectory segments. Each trajectory segment may represent periods of straight line motion.

In one aspect, generating a candidate path may involve shape matching identified pairs of sequential turns and their associated link with the map. Shape matching may be based at least in part on the distance and heading of each link. Further, shape matching may also be based at least in part on a turning angle determined with respect to two sequential links.

In one aspect, an uncertainty measure may be associated with each of the ordered plurality of anchor points.

In one aspect, at least one anchor point of the plurality of anchor points may be associated with a position of the trajectory. A time for the at least one anchor point may be determined based at least in part on the associated position. An uncertainty measure may be associated with the determined time for the at least one anchor point.

In one aspect, at least one of the plurality of anchor points may be a point of sale.

In one aspect, a dwell period may be detected based at least in part on the sensor data and one of the anchor points may be correlated with the dwell period. The dwell period may correspond to a static motion characteristic or may correspond to a fidgeting motion characteristic.

In one aspect, deriving the trajectory may involve performing a forward processing operation over the first period of time.

In one aspect, deriving the trajectory may involve performing a backward processing operation over the first period of time.

In one aspect, deriving the trajectory may involve performing a forward processing operation and a backward processing operation over the first period of time.

In one aspect, deriving the trajectory may involve performing a forward processing operation, a backward processing operation over the first period of time, and a combination of the forward processing and backward processing.

In one aspect, deriving the trajectory may involve performing a smoothing operation over the first period of time.

In one aspect, deriving the trajectory may involve performing a backward smoothing operation over the first period of time.

In one aspect, deriving the trajectory may involve performing a multiple pass processing operation over the first period of time.

In one aspect, the obtained map may be transformed into a grid of connected traces and nodes. Transforming the obtained map may involve constructing a voronoi diagram. Each node may be equidistant from at least three map entities and each trace may be equidistant from two map entities. The nodes and traces may be supplemented to complete a candidate path around a map entity.

In one aspect, the obtained map may be transformed into a polygon based geometric map.

In one aspect, characterizing turns of the trajectory may include identifying a rate of change in heading exceeding a threshold, wherein the rate of change in heading is calculated from gyroscope data.

In one aspect, characterizing turns of the trajectory may include identifying a change in heading exceeding a threshold, wherein the change in heading is calculated from determined positions of the portable device.

In one aspect, generating candidate links for each segment may include assessing an angle associated with a heading change and generating at least one candidate based on the angle.

In one aspect, generating candidate links for each segment may include assessing a distance traveled associated with each segment and generating at least one candidate for that segment based on the distance traveled.

In one aspect, deriving possible paths for the trajectory may include connecting a combination of the candidate links for each possible path. Deriving possible paths for the trajectory may also include ensuring each possible path meets a constraint. The constraint may be one or more of: (i) requiring an accumulated length of a connected combination of the candidate links to be within a threshold of a distance associated with the derived trajectory; (ii) requiring a boundary point of a connected combination of the candidate links to be within a threshold distance of an boundary point of the derived trajectory; (iii) requiring a summation of angle differences between turns of a connected combination of the candidate links and corresponding identified turns of the derived trajectory to be within a threshold angle; (iv) requiring a number of turns of a possible path that match identified turns of the derived trajectory to be within a threshold percentage; and (v) requiring a threshold percentage of the plurality of anchor points to be within a defined distance of a connected combination of the candidate links.

In one aspect, the multi-objective function may include a combination of one or more objectives selected from the group consisting of: (i) an objective that reduces angle differences between turns of a connected combination of the candidate links and the corresponding identified turns of the derived trajectory; (ii) an objective that increases a number of turns of a possible path that match identified turns of the derived trajectory, (iii) an objective that reduces a distance between a boundary point of a possible path and a boundary point of the derived trajectory, (iv) an objective that increases a number of anchor points associated with possible path and decreases a distance between each anchor point and the possible path, and (v) an objective that weights a number of anchor points associated with a possible path at least in part on a time-tag certainty for each anchor point. Time-tag certainty for an anchor point may be determined by estimating a time-tag for the anchor point based at least in part on a distance of the anchor point along the trajectory and whether the estimated time-tag is associated with a dwell period.

In one aspect, a certainty may be estimated for each anchor point of the ordered plurality of anchor points. Estimating the certainty of the ordered plurality of anchor points may include performing a local estimation based on at least one of: (i) zero-step length percentage, (ii) candidates spread factor, (iii) candidate density and (iv) time-tag certainty. Estimating the certainty of the ordered plurality of anchor points may include performing an intermediate estimation based on at least one of (i) distances between anchor points associated with the solution path and the solution path, (ii) nearest segment ratio, and (iii) adjacent segments. Estimating the certainty of the ordered plurality of anchor points comprises performing a global estimation based on at least one of (i) forward and backward order, (ii) anchor point time-tags, and (iii) merging of forward and backward order. Estimating the certainty of the ordered plurality of anchor points may also include performing a local estimation, an intermediate estimation and a global estimation.

In one aspect, a time-tag may be assigned for at least one of the ordered plurality of anchor points. Assigning the time-tag may be based at least in part on a factor selected from the group consisting of: (i) whether an anchor point falls on a candidate link and (ii) a relationship of an anchor point to a dwell period. A certainty may be estimated for the assigned time-tag. Estimating the certainty for the assigned time-tag may be based at least in part on a factor selected from the group consisting of: (i) whether an anchor point falls on a candidate link and (ii) a relationship of an anchor point to a dwell period.

In one aspect, deriving a trajectory for the portable device may include one or more of the following: (i) a forward processing operation over the first period of time; (ii) a backward processing operation over the first period of time; (iii) a forward processing operation and a backward processing operation over the first period of time; (iv) a forward processing operation, a backward processing operation over the first period of time, and a combination of the forward processing and backward processing; (v) a smoothing operation over the first period of time; (vi) a backward smoothing operation over the first period of time; and (vii) a multiple pass processing operation over the first period of time.

As noted, this disclosure may also involve a system for ordering a plurality of anchor points. In one aspect, the information received by the remote processing resources may be sensor data for the portable device and the ordering module may derive the trajectory based at least in part on the sensor data.

Further, this disclosure also includes a portable device for ordering a plurality of anchor points. In one aspect, the portable device further may have a navigation module to derive the trajectory based at least in part on the sensor data at the plurality of epochs and the communications module may transmit the trajectory.

This disclosure also pertains to a remote processing resources for ordering a plurality of anchor points. In one aspect, the server may receive sensor data for the portable device for the plurality of epochs and the ordering module may derive the trajectory based at least in part on the sensor data.

In one aspect, the server may receive the trajectory based at least in part on the sensor data at the plurality of epochs from the portable device.

Further, the techniques of this disclosure may be implemented using a portable device for ordering a plurality of anchor points. In one aspect, the portable device may include an integrated sensor assembly, configured to output sensor data for the portable device representing motion of the portable device at a plurality of epochs over a first period of time, wherein the mobility of the portable device is constrained or unconstrained within a platform and wherein the portable device may be tilted to any orientation, and a communications module for transmitting information corresponding to the epochs.

For each of the embodiments comprising a portable device, the sensor assembly may include an accelerometer and a gyroscope. The sensor assembly may be an inertial sensor implemented as a Micro Electro Mechanical System (MEMS).

EXAMPLES

The following examples describe comparing the shape of a trajectory derived from the motion sensor data to a map encompassing the trajectory in order to order the anchor points. Map information is processed to extract possible paths, which may then be compared to the trajectory shape as noted above. Accordingly, map information may initially be obtained from any suitable source, such as from on-line map service providers. As necessary, the map information may be processed into a form suitable for use, such as by forming a grid map, a geometric map or a combination. For example, the map information may be converted into an internal map data structure, where it may be saved into the local storage for future use without the overhead of downloading and processing it again if desired. Accordingly, processing the map information may include the functions of i) converting map information from various map data providers to a unified data structure, ii) preparing the necessary map data structure suitable for matching a derived trajectory of the user, and/or iii) storing the map information in local storage, such as memory 46 (for embodiments in which anchor point ordering is performed remotely) or memory 20 (for embodiments in which anchor point ordering is performed locally).

On-line indoor/outdoor map service providers may provide web Application Programming Interfaces (APIs) to access their map database. Accordingly, the corresponding APIs from the map provider may be used to obtain map information for an area encompassing the user's trajectory. Particularly notable examples of venues that may have corresponding map information include indoor environments such as retail stores that may also provide point of sale information for determining anchor points. This map information may be processed to facilitate its use, such as by decoding to extract the necessary map data used for techniques of this disclosure using the APIs and converted into a unified format such as the Geographic Javascript Objective Notation (GeoJson) format, although xml files, binary files and others may be used. The converted map data can then be saved in the local storage for the future use. The decoding and conversion may be performed by external resources and delivered in any suitable manner for use during anchor point ordering. Generally, it is desirable to minimize the number of times processing operations are performed for each venue.

In some embodiments, obtained map information may be transformed into a geometric map. As such, processing the map information may include segregating it into traversable and non-traversable regions. For example, corridors represent an important class of traversable regions in typical indoor environments. As such, a corridor clipping function may be performed to extract corridor shape information from background entities if the corridor information is not available to present the map information as a polygon based geometric map. Many conventional map service providers do not offer corridor shape information which is important in an indoor map aided algorithm. Therefore, a suitable technique for obtaining the shape of corridors that may be present in the venue may include extracting all the other entities from the background entity. The background entity may be a boundary contour that establishes a given building or level of a building or other venue. Foreground entities within a venue may include all objects such as stock shelves, rooms, checkout stands, elevators, escalators, stock shelves, rooms, checkout stands, wall boundaries and other obstacles within the area encompassed by the map. The clipping process as used herein refers to the process of cutting away from a set of 2-dimensional geometric shapes those parts that are outside a particular 'clipping' window. This can be achieved by intersecting a subject polygon (background entity) with a clipping polygon (other foreground entities on top of the background entities). The polygons may be defined by a sequence of vertices and any curves may be represented as an appropriate set of line segments.

Figure 5:
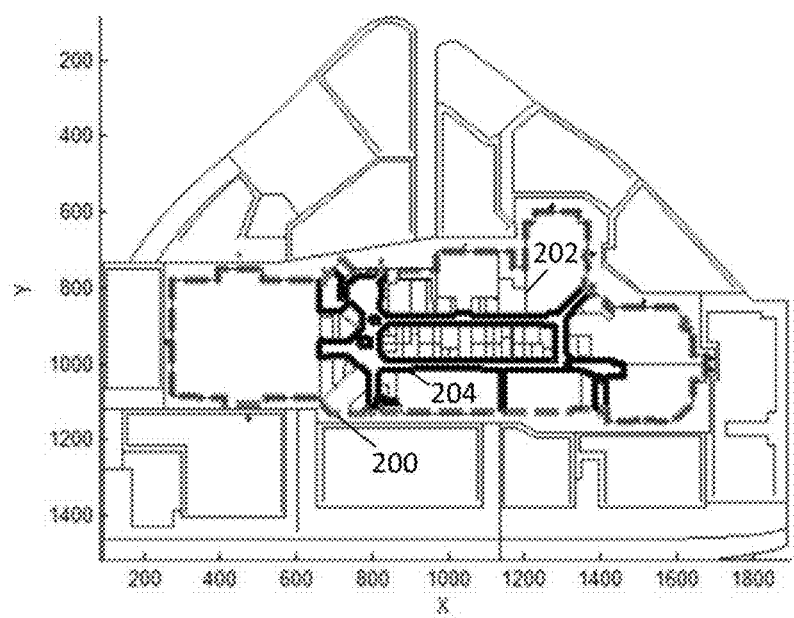
FIG. 5 is a schematic representation of map entity clipping in a geometric map according to an embodiment.

After iteratively clipping all the other entities from the background, the corridor polygon may be obtained. A suitable clipping algorithms may be configured to accommodate relatively complex polygons with holes, for example, the Vatti clipping algorithm. An illustration of the results of a clipping algorithm are shown in FIG. 5 for a representative polygon based geometric indoor map. The background entity 200 for a portion of the map is represented by a dashed line. Foreground entities are represented as polygons with fine lines, such as polygon 202 (the others are not labeled to preserve clarity), are clipped on top of background entity 200. The resulting polygon 204, represented by the heavy line, gives the shape of the corridor. The resulting corridor shape may be represented by a complex polygon. A complex polygon used herein is a polygon (without self-intersection) which has one or multiple holes inside.

As will be described below, some map entities may provide inherent position information, such as elevators, escalators, stairs that may be associated with level change scenarios or conveyors that may allow the assumption of heading or other position information. The locations of the entrances and exits to the background map entity, as well as doors or other entrances/exits to foreground entities may also be used. Still further, the direction of the entrances/exits may also be used when generating hypotheses. In a multi-level venue, the height of each level may be used with sensor information indicating changes in elevation to help determine when a level change scenario may exist.

In addition, processing may include decomposing one or more shapes of the map entities into small simpler polygons to improve the computation efficiency when ordering the anchor points. A trapezoid decomposition may be used to decompose relatively complex polygons into more simple trapezoids, while a convex decomposition may be used to partition relatively complex polygons into more simple convex polygons. An optimal decomposition algorithms may be applied to generate a reduced number of polygons after the decomposition process. Any one or combination of decomposition methods may be employed.

Figure 6:
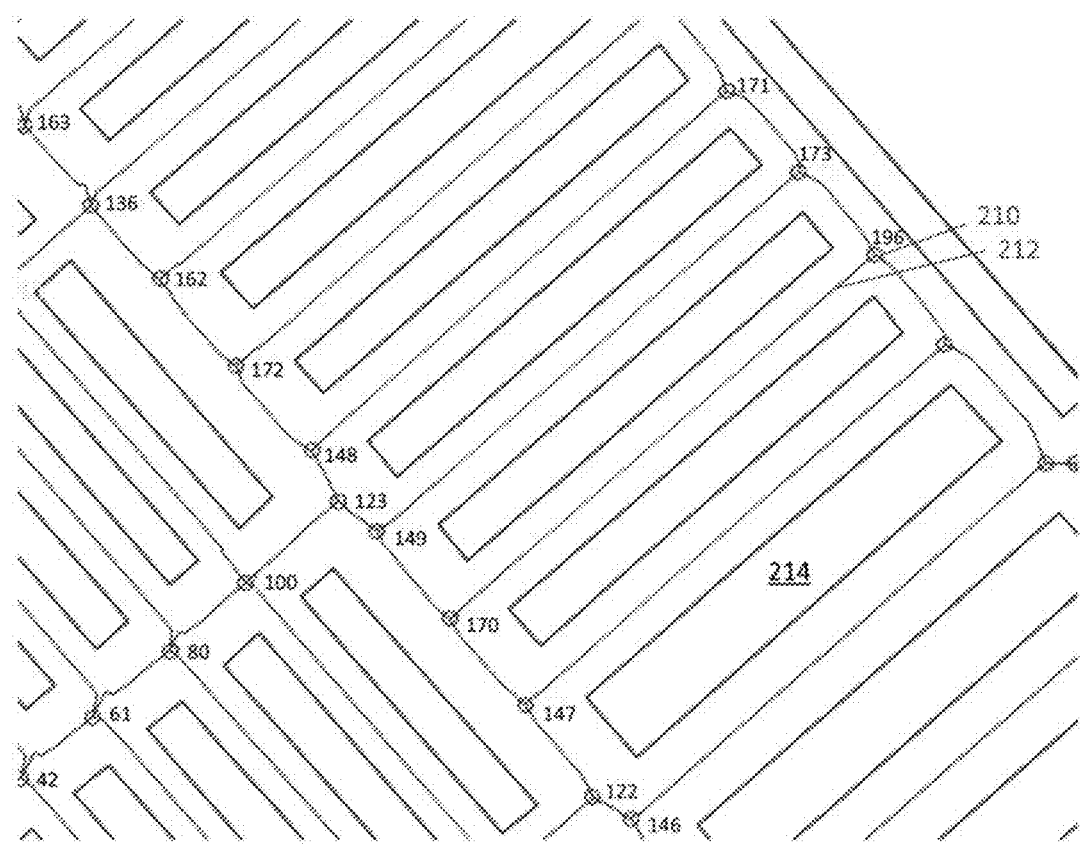
FIG. 6 is a schematic representation of grid map according to an embodiment.

Processing the map information may also include transforming the traversable areas of the indoor maps with connected traces and nodes in a grid map. Connected traces and nodes may contain both the geometric and the topological information of the map. Any suitable technique may be used to generate the grid map, such as for example by using a voronoi diagram, to represent candidate paths through the venue. An example voronoi diagram is shown in FIG. 6, and includes the characteristic elements of nodes, represented by circles, such as node #196 indicated as element 210 and traces, represented by the connecting lines, such as element 212. A node is any point on the map equidistant to three or more closest objects, the map entities indicated by solid polygons, such as element 214. In this example, the map entities shown are rectangular shelves. To illustrate these concepts, it may be seen that node #196 has three equidistant closest objects, namely the two surrounding shelves and the wall. Similarly, node #100 has four equidistant objects, the four surrounding shelves. Correspondingly, a trace is a set of points (i.e., a line) which is equidistant to only two closest objects. The straight line connecting node #196 and node #170 is an example of a trace, as each point of the line has only two closest objects. Thus, the grid map shown in FIG. 6 is characteristic of a retail venue with regularly spaced rectangular shelves, with the nodes and tracks representing candidate paths that a user could take around the map entities.

Depending on the configuration of the retail venue, the nodes and traces developed from the voronoi diagram may not account for all possible routes, such as routes around objects which are located at the perimeter of open spaces in the retail venue. Additional operations as shown in FIG. 7 may be performed to complete the possible routes by adding supplemental nodes, indicated by squares such as 216 and traces, indicated by dashed tracks such as 218. The supplemental nodes and traces complete candidate paths around map entities.

Figure 8:
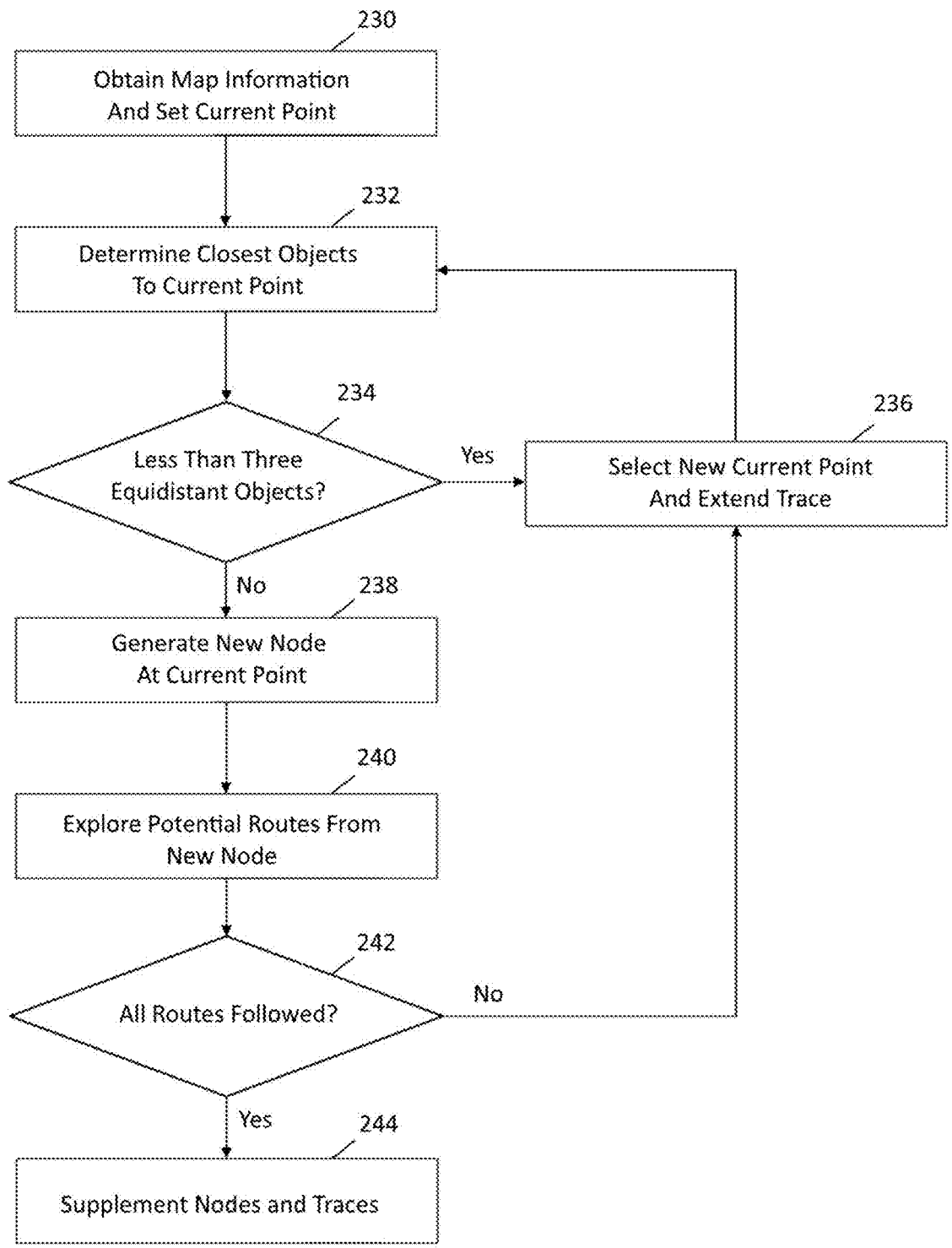
FIG. 8 is a schematic representation of routine for generating a grid map according to an embodiment.

One suitable routine for generating a grid map for use in ordering anchor points is represented by the flowchart shown in FIG. 8. Beginning with 230, map information for a venue, such as a retail store, may be obtained, with map entities represented by polygons as discussed above. An initial starting position may be selected to as the current point for generation of the voronoi diagram. In 232, the closest objects to the current point are determined. The routine branches in 234, depending on the number of closest objects. If less than three closest objects are equidistant, a new current point is selected and a trace is created or continued to the new current point in 236. The routine then returns to 232 to determine the closest objects with respect to the new current point. If three or more closest objects are equidistant in 234, the current point is designated a node in 238. Next, possible routes starting from the new node are explored in 240. A determination is made in 242 if a new route may be started. If so, the routine returns to 236 and a trace is formed to a new current point along the new route. If it is determined in 242 that all possible routes have been explored, the routine continues to 244 to determine whether any supplemental nodes and/or traces are required to complete routes around any of the map entities as described above. The complete set of nodes and traces than may be used to define candidate paths that the user could have traversed through the venue.

In one aspect, a grid map may enhance the geometric aspects of map information as well as providing topological aspects. The topological information from the indoor map may be also applied to improve the reliability and the accuracy of the anchor point ordering. For example, a retail venue map may be readily divided into structured areas and non-structured areas. Non-structured areas, such as open space, isolated booths and the like, may benefit from geometric based techniques as described above. However, structured areas, such as aligned shelves, booths and similar features may be abstracted as connected traces and nodes to be used in a grid based map.

Figure 9:
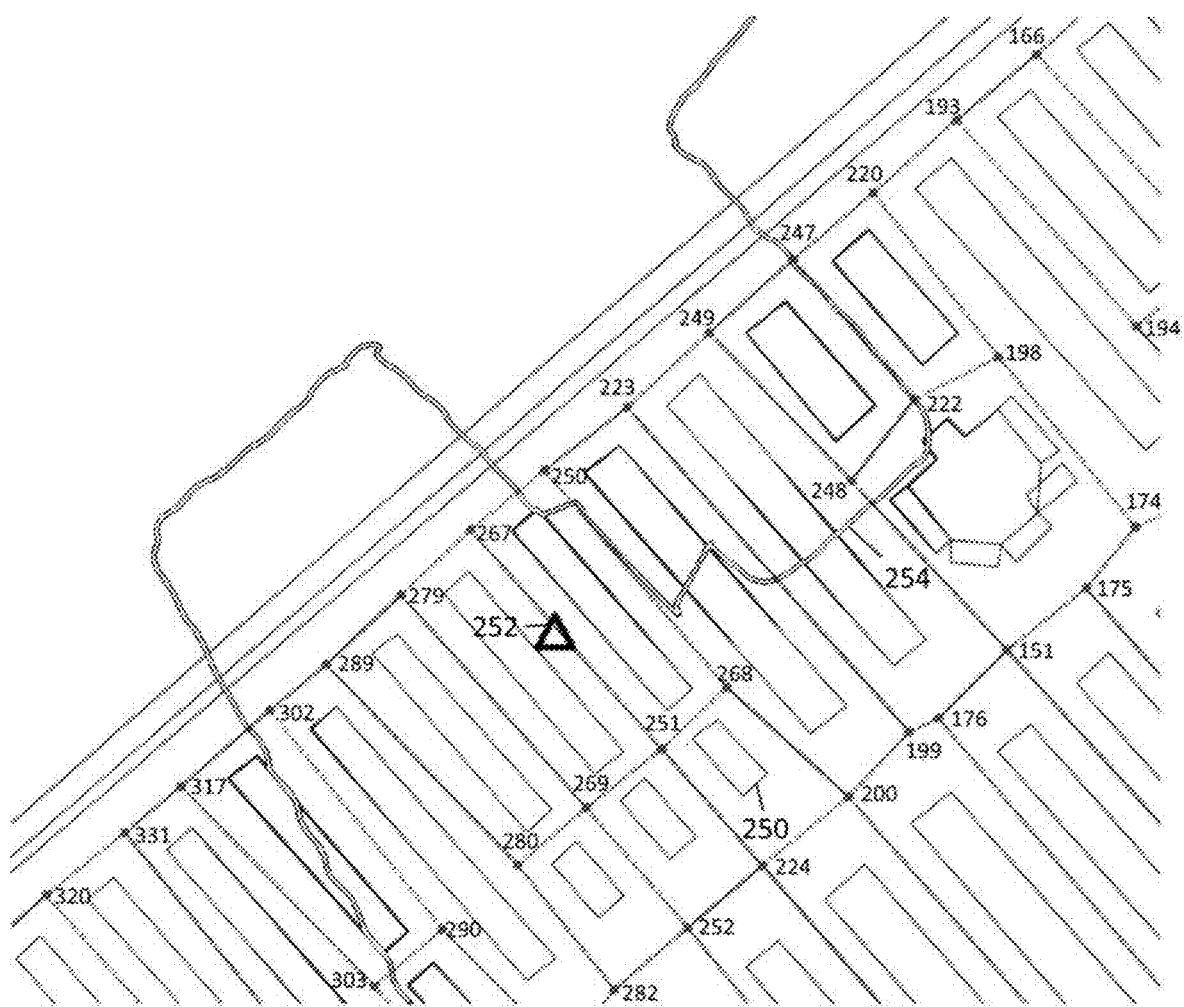
FIG. 9 is a schematic representation of portion of a user trajectory for shape matching with map information according to an embodiment.

As described above, shape matching a trajectory derived from motion sensor data may be used to identify candidate paths from the possible routes indicated by the map information, such as interconnected nodes and traces of a grid map. Further, anchor points may help select a solution path that represents the actual user trajectory from the candidate paths, so that the anchor points may be properly ordered. Particularly in the context of a retail venue, point of sale information may be used to identify suitable anchor points in the form of the known locations of items purchased by the user. Such an anchor point may be associated with the map information by locating the respective coordinates of the anchor point on the map. For example, FIG. 9 illustrates a portion of a grid map for a retail venue, with nodes represented by circles, traces represented by connecting dotted lines and objects represented by polygons, such as map entity 250. An anchor point 252 corresponding to the known location of an item purchased by the user, as determined from point of sale information, is indicated by a triangle. As shown, anchor point 252 is located on the edge that is formed by the two nodes of #267 and #251 on the indoor grid map.

A portion of the user trajectory derived from motion sensor data, such as by navigation module 36 of portable device 16, is represented in FIG. 9 as outline track 254. Although the user trajectory has clearly drifted, its shape may still be matched to the possible routes established by the grid map. To illustrate, the start of the trajectory may be known to commence around node #303, so that the initial heading is in the direction from node #303 to node #317. As shown, track 254 undergoes two heading changes corresponding to right hand turns following the start of the trajectory. The direction of these turns and the distance between them establishes a characteristic shape that may be matched. Given a start at node #303, the grid map indicates that one possible route matching the shape of track 254 may be defined by the sequence of nodes #303, #317, #302, #279, #267, and #251 and the connecting traces. However, other possible routes may also exist, such as the route defined by the sequence of nodes #303, #317, #302, #279, #267, #250, and #268 and their connecting traces. From these two candidate paths, a solution path may be identified that incorporates the location of anchor point 252. Specifically, since anchor point 252 is located between nodes #267 and #251, the candidate corresponding to the first possible route may be selected as the solution path over the second possible route. A similar process may be repeated throughout the trajectory and for any available anchor points.

To facilitate matching the shape of a user trajectory as derived from motion sensor data to the possible routes through the retail venue, such as those established by the interconnected nodes and traces of a grid map, the trajectory may be analyzed to characterize turns, which may then be shape matched to the possible routes. Thus, even if the trajectory derived from motion sensor data drifts from the actual trajectory, the shape may still be used to identify candidate paths in light of the possible routes indicated by the map. The trajectory may be decomposed to identify turns that occurred. Further, links between two consecutive turns may further characterize the shape of the trajectory.

Figure 10:
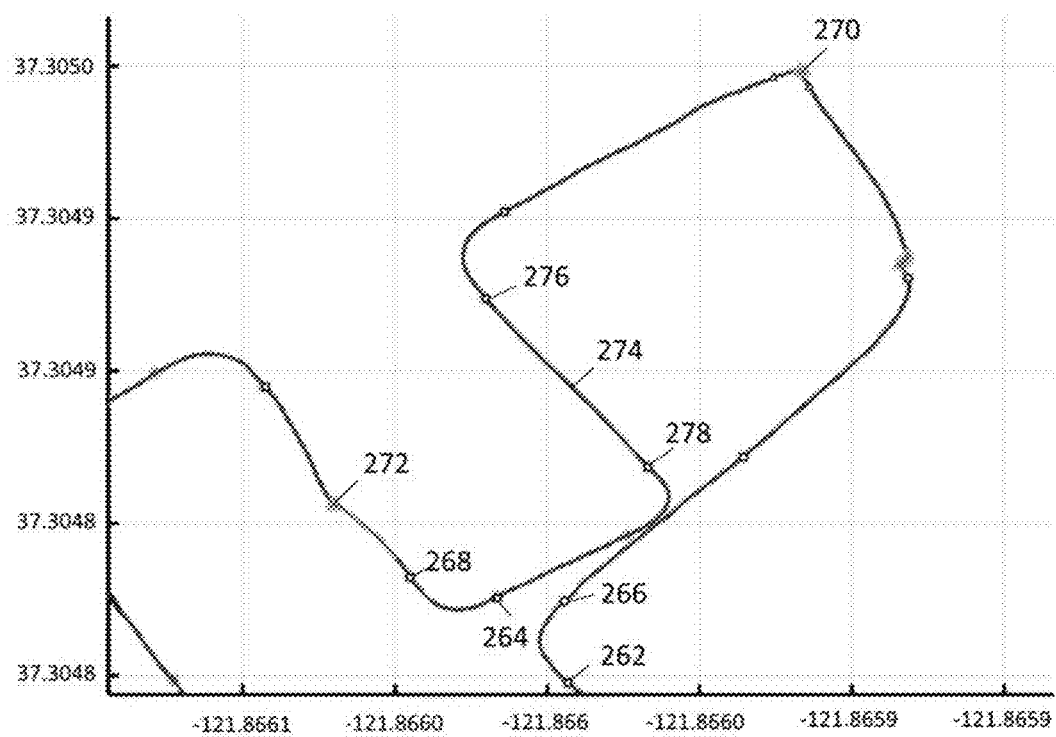
FIG. 10 is a schematic representation of decomposing a portion of a user trajectory into turns and links according to an embodiment.

For example, any suitable turn identification algorithm may be employed to characterize turns based at least in part on the underlying device heading of portable device 16, or the platform heading of the user, by examining the accumulative change rate of the heading information. In one embodiment, when a threshold rate of change is exceeded, a turn start may be identified. Correspondingly, when the rate of change falls back below the threshold, a turn end may be identified, such that the turn is defined as the portion of the trajectory between the turn start and the turn end. In the context of the example shown in FIG. 10, a portion of a trajectory derived from motion sensor data is represented by black track 260. Turn starts may be identified by squares, such as turn starts 262 and 264. Turn ends may be identified by circles, such as turn ends 266 and 268. If desired, heading information from the motion sensor data may be filtered to provide better determination of the starting and ending of turns. For example, high frequency heading noise may be present and may be reduced by employing a low pass filter.

Turns may also be identified in the context of periods of non-meaningful motion, such as fidgeting. A user may stop during the trajectory and may or may not interact with the portable device. During such periods, motion detected by the portable device may be characterized as a non-meaningful fidgeting period. Step length information may also be used when characterizing non-meaningful fidgeting periods. However, when the fidgeting period stops, the trajectory may have a new heading that constitutes a turn. When the heading change following a fidgeting period exceeds a threshold, a turn may be identified as shown by pair of triangles for fidgeting period 270. In contrast, the heading change following fidgeting period 272 did not exceed the threshold, so no turn has been identified.

In further embodiments, the trajectory shape may be analyzed directly using the concept of cumulative turning angle function known in the shape matching literature.

The trajectory may be further characterized by identifying links between consecutive turns. For example, link 274 may be identified as the portion of the trajectory extending between turn end 276 and turn start 278.

Another example of a suitable technique for identifying turns may involve characterizing an intersection between adjacent trajectory segments. Each trajectory segment may represent periods of straight line motion. The position of the portable device at multiple epochs along the trajectory may be determined, such as by using forward and/or backward processing as described herein. Positions that fall within a suitable threshold of a line may be grouped into segments corresponding to straight line motion of the portable device. When adjacent segments form an angle exceeding a threshold, a turn may identified having a center at the intersection between the adjacent segments. As an illustration only and without limitation, examples of suitable thresholds be in the range of 25° to 45°.

Figure 11:
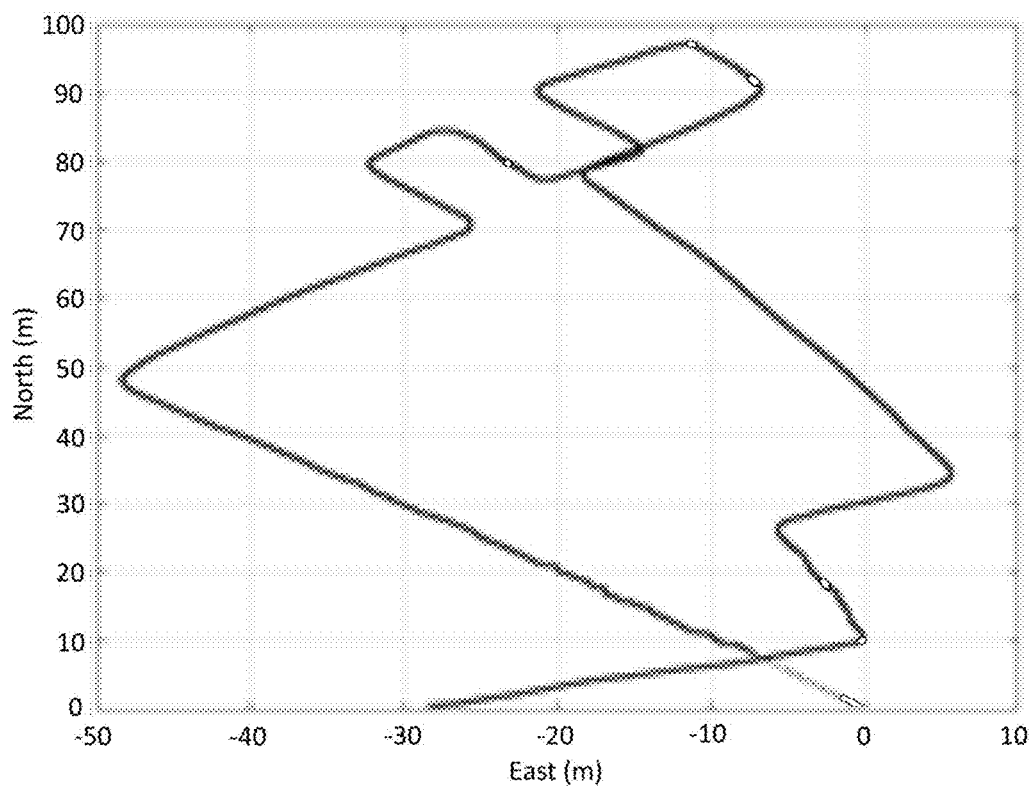
FIG. 11 is a schematic representation of a sample trajectory according to an embodiment.
Figure 12:
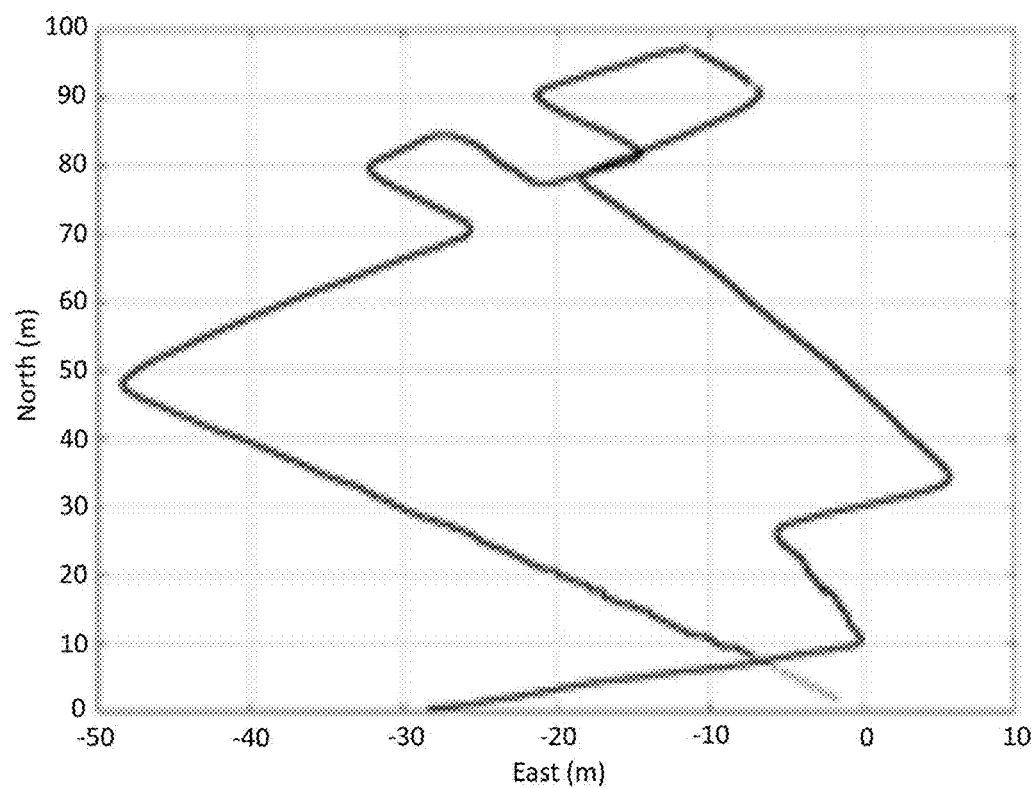
FIG. 12 is a schematic representation of the sample trajectory of FIG. 11 following removal of fidgeting and zero step length periods according to an embodiment.
Figure 13:
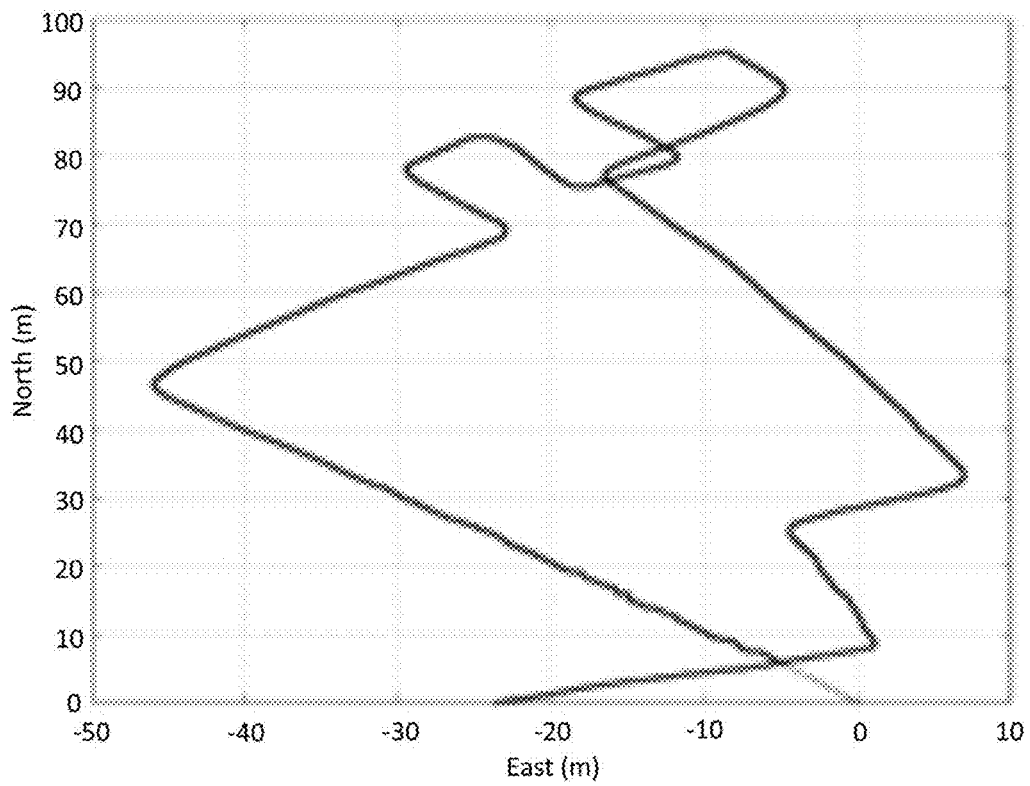
FIG. 13 is a schematic representation of the reconnected sample trajectory of FIG. 11 according to an embodiment.
Figure 14:
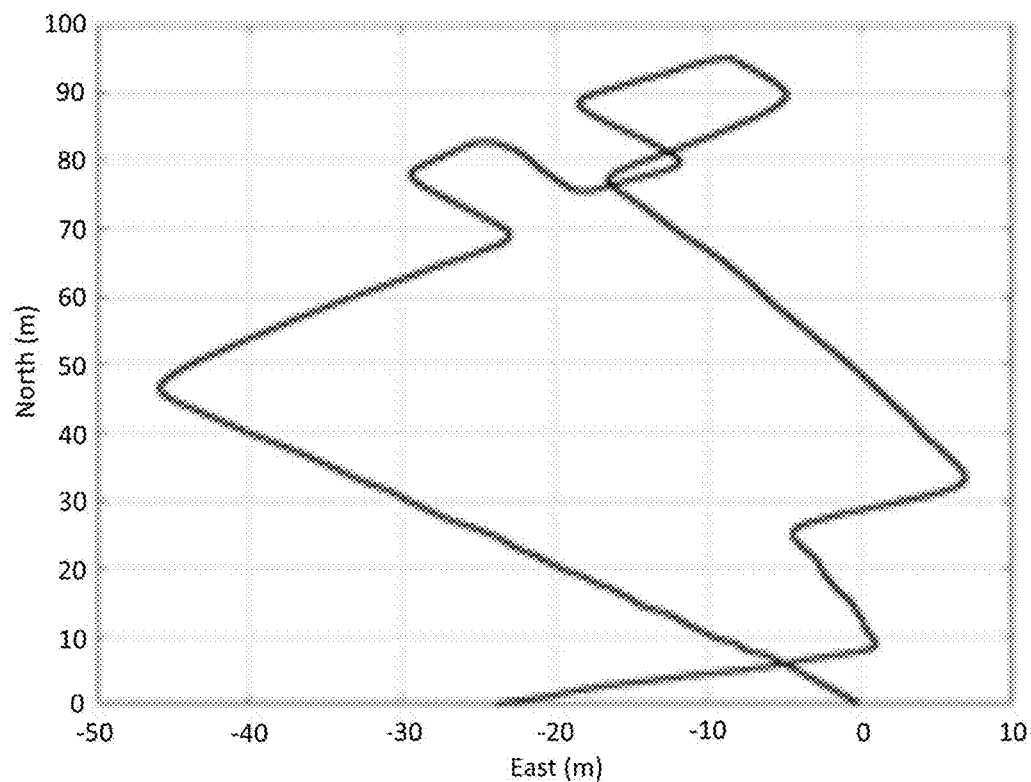
FIG. 14 is a schematic representation of the smoothed sample trajectory of FIG. 11 according to an embodiment.
Figure 15:
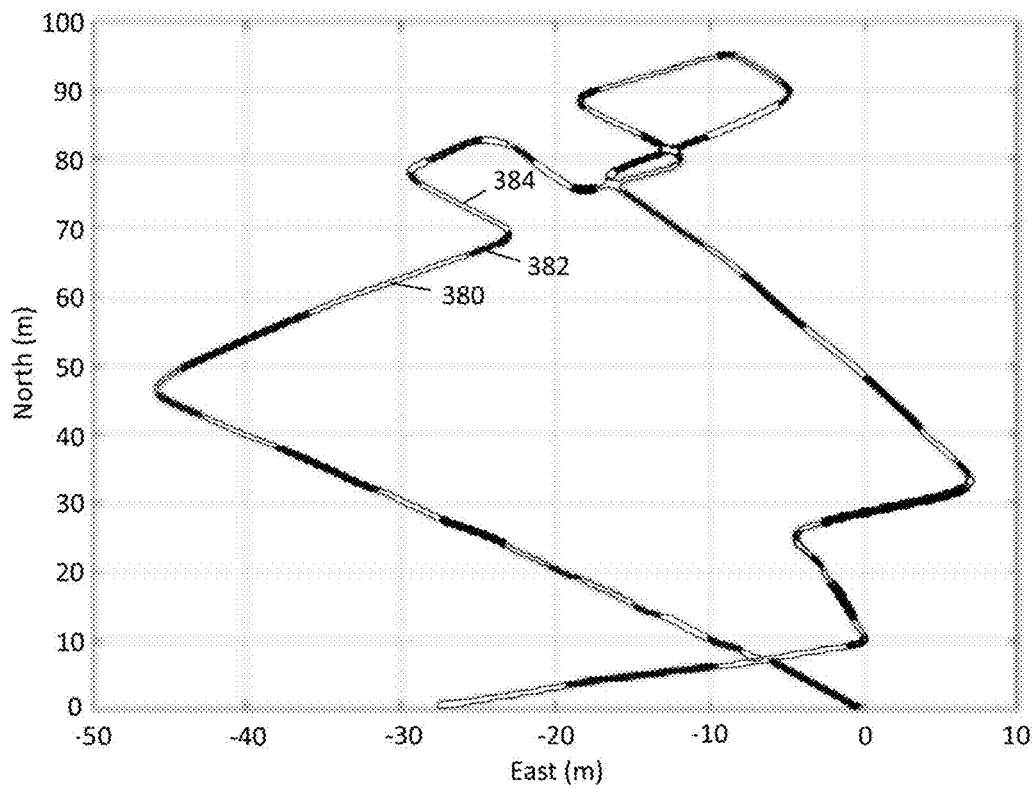
FIG. 15 is a schematic representation of the sample trajectory of FIG. 11 divided into adjacent segments according to an embodiment.
Figure 16:
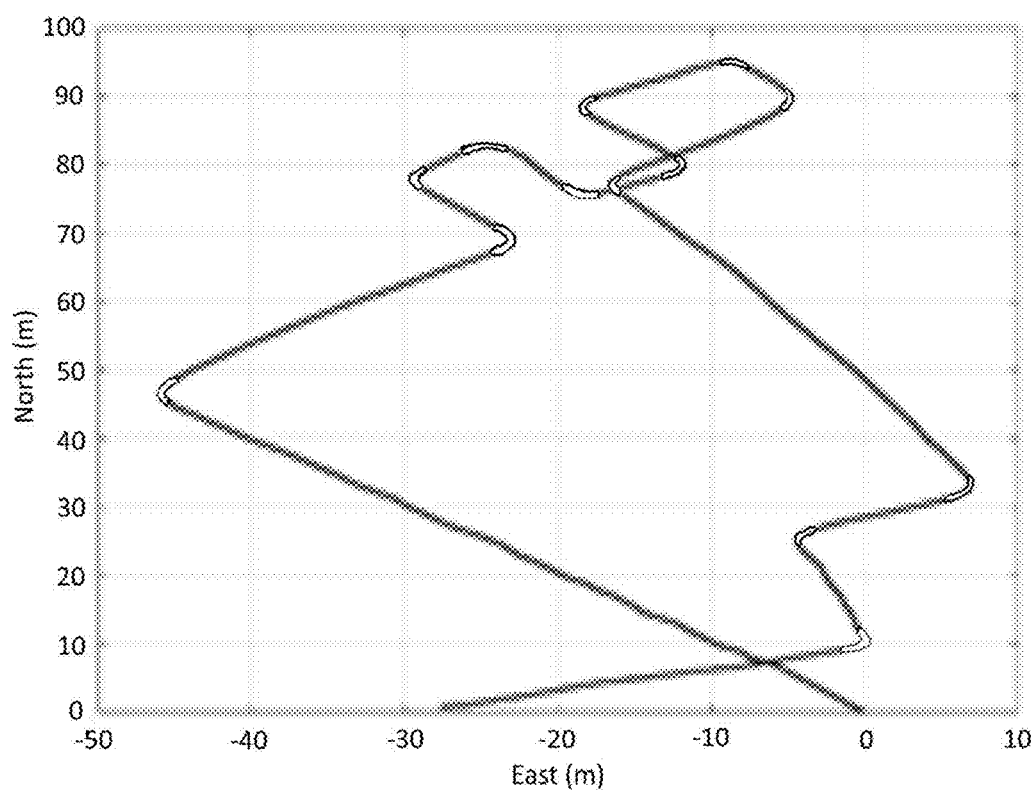
FIG. 16 is a schematic representation of the sample trajectory of FIG. 11 following turn identification between adjacent segments according to an embodiment.
Figure 17:
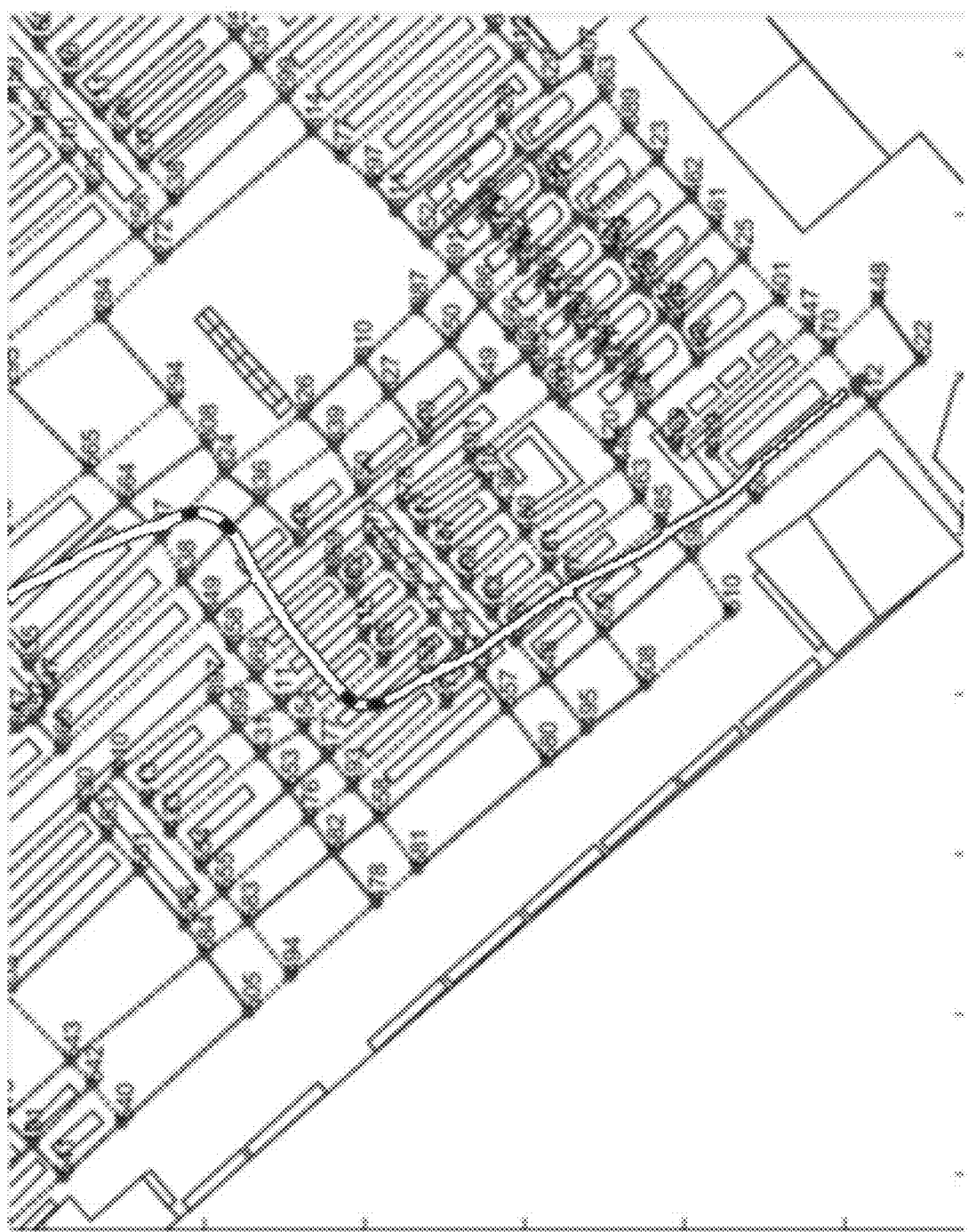
FIG. 17 is a schematic representation of shape matching turns and links of a user trajectory on a grid map according to an embodiment.
Figure 18:
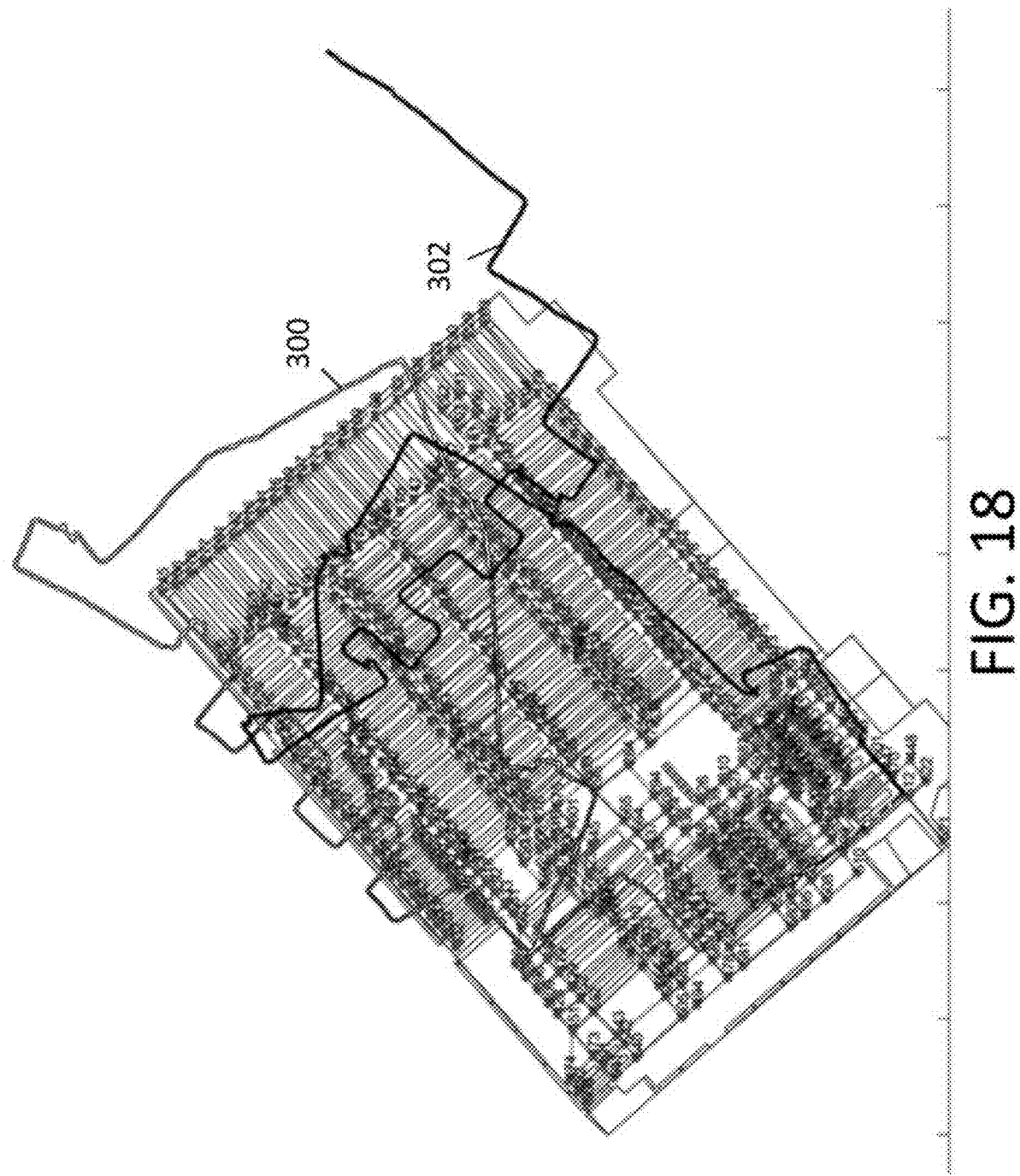
FIG. 18 is a schematic representation showing trajectories derived by forward and backward processing according to an embodiment.

To help illustrate the use of trajectory segments for turn identification, FIG. 11 depicts a sample trajectory. To facilitate turn identification, an initial series of processing steps optionally may be performed on the trajectory. First, fidgeting periods and/or periods characterized as having zero step length may be identified, designated by the outlined portions of the trajectory in FIG. 11. These periods may then be removed from the trajectory as shown in FIG. 12. The remaining portions of the trajectory may then be connected as indicated in FIG. 13. Further, one or more smoothing passes may be performed to generate a smoothed trajectory as shown in FIG. 14. Following these initial operations, the trajectory may be divided into a plurality of adjacent straight line segments. FIG. 15 shows the trajectory after being divided into the straight line segments, with alternating segments designated by outlined and solid lines. The angles formed by adjacent segment pairs may be compared to a threshold. When the angle exceeds the threshold, a turn may be identified, with the center of the turn located at the intersection between the segments. For example, the angle formed by segments 280 and 282 does not exceed the threshold, so both segments may be characterized as continuous straight line motion without a turn. In comparison, the angle formed by segments 282 and 284 does exceed the threshold and correspondingly, a turn may be identified at their intersection. After grouping all segments that do not exceed the threshold together, an output trajectory may be generated as shown in FIG. 16, with each turn designated by an outlined portion of the trajectory.

Any one or combination of the turn identification techniques described above, or others, may be employed as desired. In some embodiments, different techniques may be performed in parallel and used to verify or reject one or more of the identified turns.

Following decomposition of the trajectory derived from motion sensor data, any of the identified turns and links may be used to shape match the trajectory with the possible routes established by the map information to generate candidate paths. Another exemplary grid map for a retail venue is shown in FIG. 11, with nodes represented by open circles, traces represented by connecting dotted lines and objects represented by polygons. The trajectory derived from motion sensor data is represented by outline track 290. Two consecutive turns, with respective starts and ends, are indicated on track 290 by the closed circles and a first link exists between the start of the trajectory and the first turn and a second link exists between the two turns. The initial link may be used as a basis for shape matching to the grid map. Link parameters include the length of the link, which represents the distance that the user over the portion of the trajectory corresponding to the link, and the heading of the link. The heading may be determined by the relationship of the start of the link to the end of the link. As shown in FIG. 11, the initial link starts at node #512 and has minimal heading drift. To match the initial link to the grid map, the distance starting from node #512 along the heading of the link may be seen to extend to either node #558 or node #582. The distance on the grid map from node #512 to #558 or #582 may then be compared with the length of the link through a ratio test. Depending on the results, either or both nodes #558 and #582 may be identified as nodes on candidate paths. All the possible candidates for the initial link may be maintained.

Next, the turn following the initial link may be matched to the map to continue the process. Each turn may have a turning angle parameter that may be determined by the heading differences between the precedent link segment and the subsequent link segment. The magnitude and direction of the turning angle may be used to determine whether the current turn is a right or a left turn. For the candidate path incorporating node #558 as end of the initial link, a right hand turn may be seen to lead to node #493. If there is a grid edge between node #558 and #476, then node #476 may also be determined as a possible candidate node that forms a right turn with node #558, depending on the angle discrimination test threshold when comparing the turning angle magnitude of the trajectory turn with the approximately 90 degrees right turn of the grid map.

Accordingly, all candidate nodes and traces that are identified by shape matching to the decomposed trajectory may be maintained as candidate paths. As described above in the context of FIG. 9, any anchor points that have been identified, such as from point of sale information, may then be used to select a solution path. For example, a candidate path that does not pass by a known anchor point may be excluded. In some embodiments, the solution path may be selected as the candidate that best fits the anchor points. Once a solution path has been selected, the anchor points may be ordered based on their sequence in relation to the solution path. Further, the user position from the derived trajectory may be correlated to the known position of each anchor point so that timing information may also be determined for when the user was at the anchor points. As will be appreciated, determining timing information for an anchor point allows it to be used directly as an update for a sensor-based navigation solution. In some embodiments, the ordering of the anchor points and/or the timing information may be associated with an uncertainty measure.

The operations of navigation module 36 in deriving a user trajectory based on motion sensor data has primarily been described in the context of forward processing the sensor data. However, in some embodiments, performance may be improved by also implementing backward processing of the sensor data. For example, FIG. 12 shows an example of a trajectory derived by forward processing as outline track 300 and a trajectory derived by backward processing as black track 302. Ordering of the anchor points may benefit from the additional backward solution. Notably, the same turn identification procedure may be applied to the backward processing so that the identified turns may verify the turns identified from forward processing or complement the forward solution if a turn was not detected. Further, the same ordering process may be applied to the backward solution, so that the backward ordering results may be combined with the forward ordering results to help resolve any uncertainties in the anchor point ordering.

Additionally, one or more smoothing passes may be performed in conjunction with forward and/or backward processing the motion sensor data. Input data may also be included from other sources when available, such as absolute navigation information, models of user dynamics (e.g., step length estimation), characteristics of sensor performance (e.g.), supplemental sensor data and others. The navigation solution used to derive the user trajectory may include any suitable information related to the position, motion and/or orientation of portable device 16. For example, a navigation solution may include position, velocity and attitude, position and attitude, position and velocity, position and speed, attitude alone or other combinations of these quantities. The navigation solution may also include other related quantities, such as the quantities used for the errors in input data. The term navigation used in this application is not limited to online or real-time navigation solutions, it may also include offline or post-processing solutions among others.

Generally, forward and backward processing of the input data may be performed to derive interim navigation solutions. One or more quantities of the interim navigation solutions may be combined to smooth the quantities. Further passes of forward and backward processing may performed as desired using quantities of the navigation solution that were combined to further enhance the navigation solutions. Backward processing may also be helpful for a long trajectory when positioning information toward the end of the trajectory is available, such as from an anchor point like a checkout point or store exit. A backward processed navigation solution may significantly reduce the accumulated error that may otherwise occur. Furthermore, more reliable misalignment estimates may be obtained. Further details regarding forward and backward processing and smoothing operations that may be performed are described in co-pending, commonly-assigned U.S. patent application Ser. No. 15/054,792, filed Feb. 26, 2016, which is entitled "Method and Systems for Multiple Pass Smoothing," and is incorporated by reference in its entirety.

It will also be appreciated that the motion sensor data may indicate one or more periods when the position of the portable device 16 is relatively stationary, such as the fidgeting periods described above. In addition to such periods when portable device 16 is undergoing non-meaningful motion, stationary periods may also be characterized by portable device 16 being substantially static or motionless. Such fidgeting and stationary periods may indicate an interval when the user has paused during the trajectory and may be termed a "dwell." A correlation may exist between a dwell and a point of sale anchor point. Generally, a user may stop when selecting an item for purchase. Correspondingly, a dwell period may be used to help order and/or time-tag an anchor point. However, it will be recognized that a complete correlation may not exist. A user may not dwell when selecting an item for purchase if the user simply takes the item while passing by. Similarly, a user may stop or pause without selecting an item for purchase. Nevertheless, dwells may facilitate the ordering process, as they may be used to constrain the route derived by motion sensor data. Further, for scenarios such as revisiting anchor points and/or ambiguous moving directions in a corridor between shelves, dwells may be used to help distinguish the order of anchor points.

As noted, this disclosure is directed to navigation techniques that may be used to aid sensor-based positioning to help reduce degradation in the solution that may occur exponentially as a function of time due to the inherent bias and drift errors of the measurements from the inertial sensors. For example, map-matching techniques may be used in conjunction with anchor points, such as those established from point of sale information, to generate candidate paths and/or weight candidate paths that pass by anchor points in the correct order relative to other candidates that do not pass the anchor points or pass them in the wrong order. In some embodiments, ordering module 48 may employ an algorithm in which the order of anchor points is formulated as a constrained global optimization problem. Correspondingly, the output of the global optimization algorithm may be a set of ordered anchor points that may be used as feedback by a map matching engine. Moreover, uncertainty in the output of the global optimization algorithm may be estimated using a multi-staged global approach.

Figure 19:
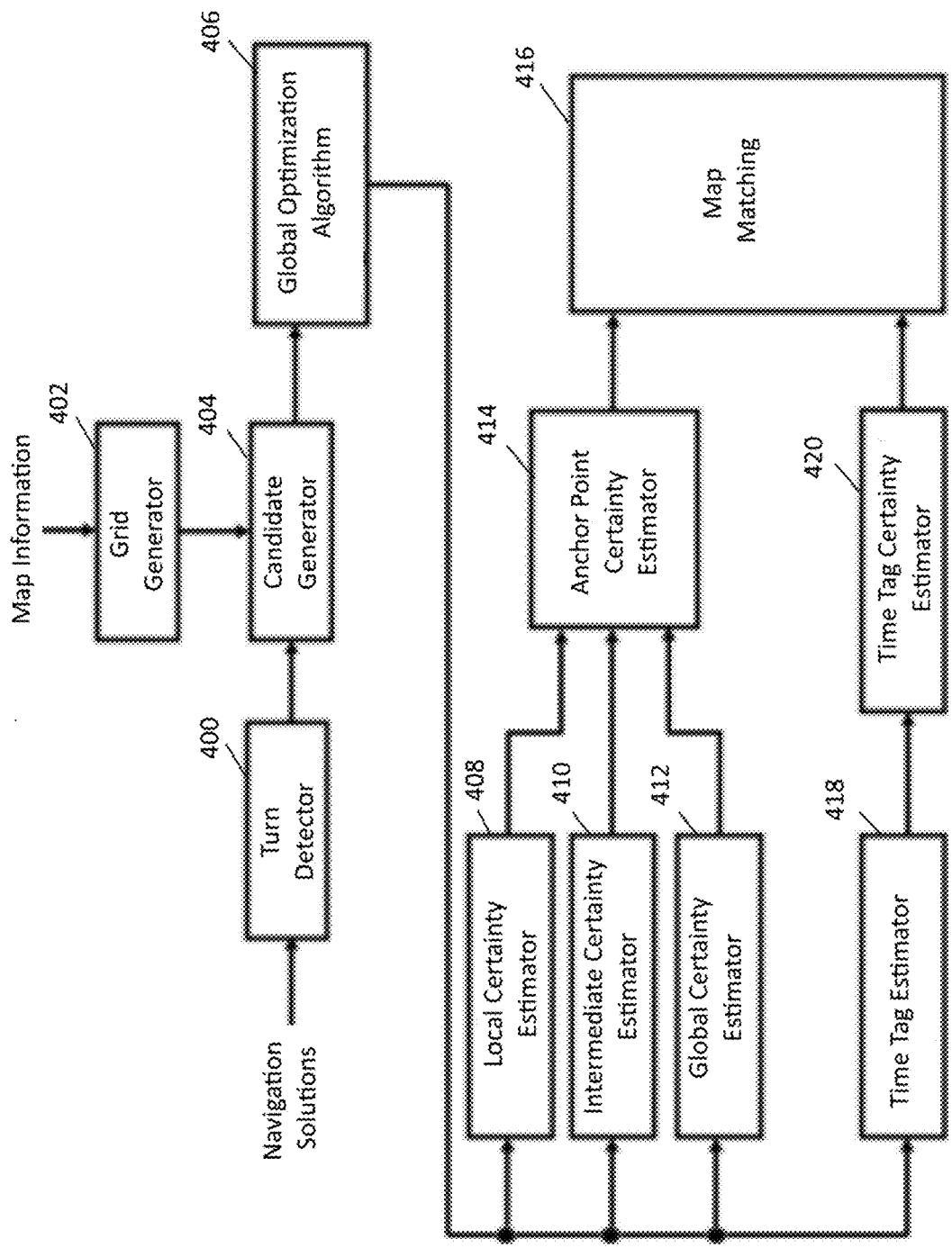
FIG. 19 is a schematic representation of a system for ordering anchor points using a global optimization algorithm according to an embodiment.

A schematic depiction of one exemplary implementation of a global optimization algorithm is shown in FIG. 19, such as may be performed by ordering module 48. Navigation solutions representing a trajectory from a first position to a second position output by navigation module 36 may be fed to turn detector 400. With respect to a given trajectory, the first and second positions may represent the boundary points of the trajectory, such as the starting position and the ending position. The navigation solutions may include position, velocity or attitude determinations, in any desired combination, such as position, velocity and attitude, or position and attitude only, attitude and velocity only, or even attitude or position only. As described above, any suitable turn identification technique or combination of techniques may be employed, including heading-based and position-based techniques. The main function of the turn detectors is to compute an array containing the start and the end epochs of all detected turns in the TPN trajectory. For example, heading-based turn detection may identify turns based on an empirically preset threshold for the rate of change of the moving platform's heading and position-based turn detection may identify turns based on an empirically preset threshold for the rate of change of the heading detected by the change in position in the forward direction of the moving platform. Turn identification segments the trajectory into a series of time-tagged segments and turns. Further, map information may be fed to grid generator 402 to produce a grid map representing traversable regions of the venue encompassing the trajectory following the discussion above. Outputs from turn detector 400 and grid generator 402 may be fed to candidate generator 404 to produce candidate links of the grid map, also following the discussion above, to allow matching the segmented trajectory to all possible routes on the grid map.

The candidate links from candidate generator 404 are used by global optimization algorithm 406 to represent all the possible paths from the first position to the second position of the trajectory, each of which may be scored by evaluating a multi-objective function described below. The estimated anchor point order produced by global optimization algorithm 406 may then be evaluated for certainty. As indicated, the order certainty may be computed for every anchor point using a weighted sum of local certainty estimator 408, intermediate certainty estimator 410 and global certainty estimator 412. Every ordered anchor point may be assigned a local, intermediate and global order certainty measures and a weighting function may be used by anchor point order certainty estimator 414 to compute one value for the order certainty. The certainty measure may guide map matching 416, for example by ignoring anchor points with insufficient certainty measures and thus providing a more accurate map-matched solution.

Additionally, the ordered anchor points may be provided to time-tag estimator 418 to assign a time to the anchor points corresponding to the sensor readings for the epoch of the trajectory passing by access point. Time-tag certainty estimator 420 may assess the confidence of the time assignments and provide the information to the map matching operation 416. As will be appreciated, map matching may be enhanced by estimating the times of the anchor points relative to the trajectory. To reduce the chance of an incorrectly time-tagged anchor point from disrupting the chosen solution, the certainty of the estimated time-tag is of significant importance. The combination of time-tag estimator 418 and time-tag certainty estimator 420 correspondingly provides the time-tag of each ordered anchor point along with a confidence in the computed time-tag. Map matching may then generate new hypothesis using only those anchor points with sufficient certainty measures. As an illustration, the time-tag of an ordered anchor point may be estimated by identifying portions of the trajectory with little or no change in position that may occur when the user is selecting an item for purchase, resulting in a dwell as described above. By comparing the length and position of the dwell periods to the positions of the anchor points on the candidate link, a time may be assigned to each anchor point. Time-tag certainty estimator 420 may then utilize a weighting function based on the anchor point order certainty and the position of anchor point from the dwell periods to estimate the time-tag certainty.

Figure 20:
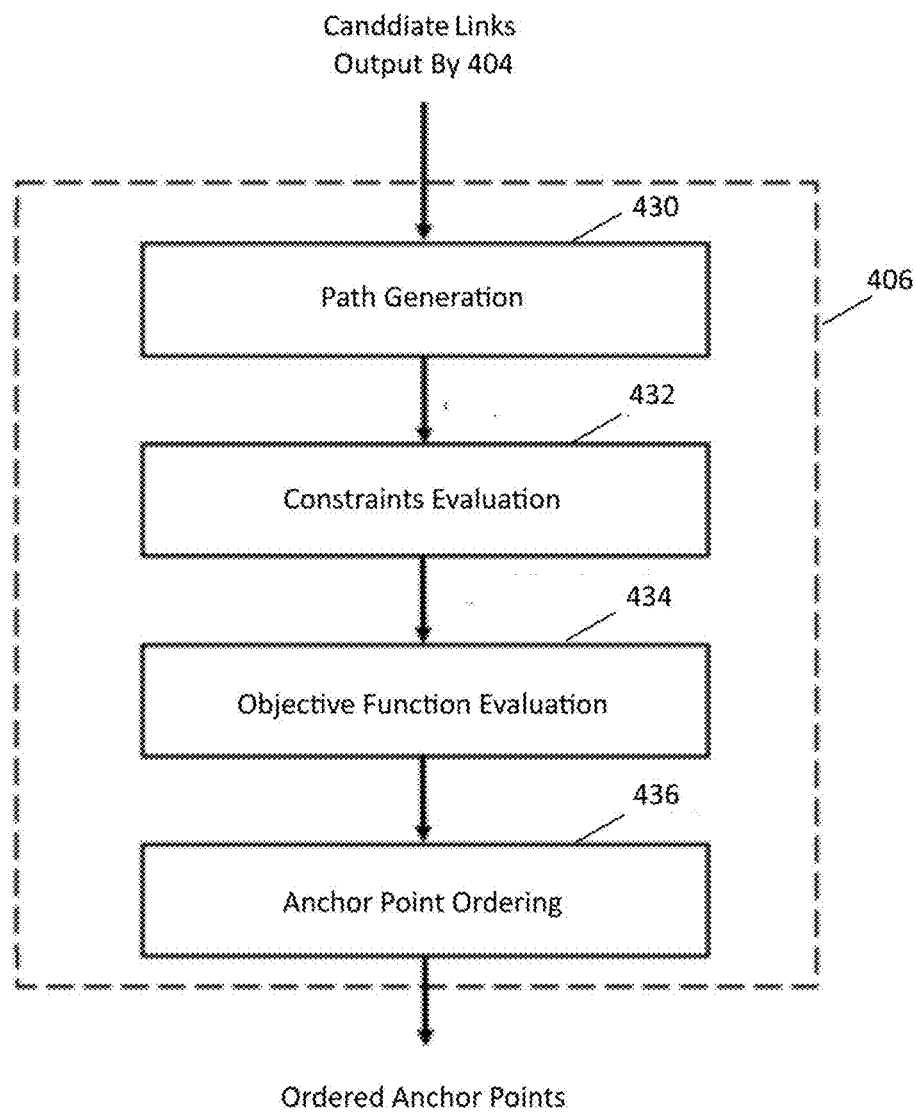
FIG. 20 is a schematic representation of global optimization algorithm according to an embodiment.

Further details regarding an embodiment of global optimization algorithm 406 are schematically depicted in the flow chart of FIG. 20. As indicated, path generation 430 produces all possible paths from the first position to the second position of the trajectory using the candidate links from candidate generator 404. Constraints evaluation in 432 may select qualified candidate path from the set of all generated candidate paths. For example, the formulated optimization problem may be constrained by the condition that the first and second positions of the trajectory for any qualified candidate path be within a certain range from the well-known entrance and exit location of the venue. As another example, only anchor points within an empirically preset adaptive MSE threshold may be assigned to each qualified path. In a further example, the length of a qualified path may be required to be within a certain ratio of the accumulated distance from the trajectory. In 434, the multi-objective function may be evaluated. As will be described in further detail below, the multi-objective function may be configured to maximize the number of anchor points on a given path and minimize the MSE of the distance of anchor points that do not reside on the same path. Moreover, the multi-objective function may also maximize the summation of the time-tag certainty of APs assigned to each path while minimizing the summation of the difference between the angle of the trajectory turns and the path turns. The global optimization algorithm may select the candidate path with the highest score to order the anchor points in 436. Accordingly, the global optimization algorithm 406 may determine the correct order of anchor points to assist map-matching and consequently estimating a more accurate map-matched solution.

Figure 21:
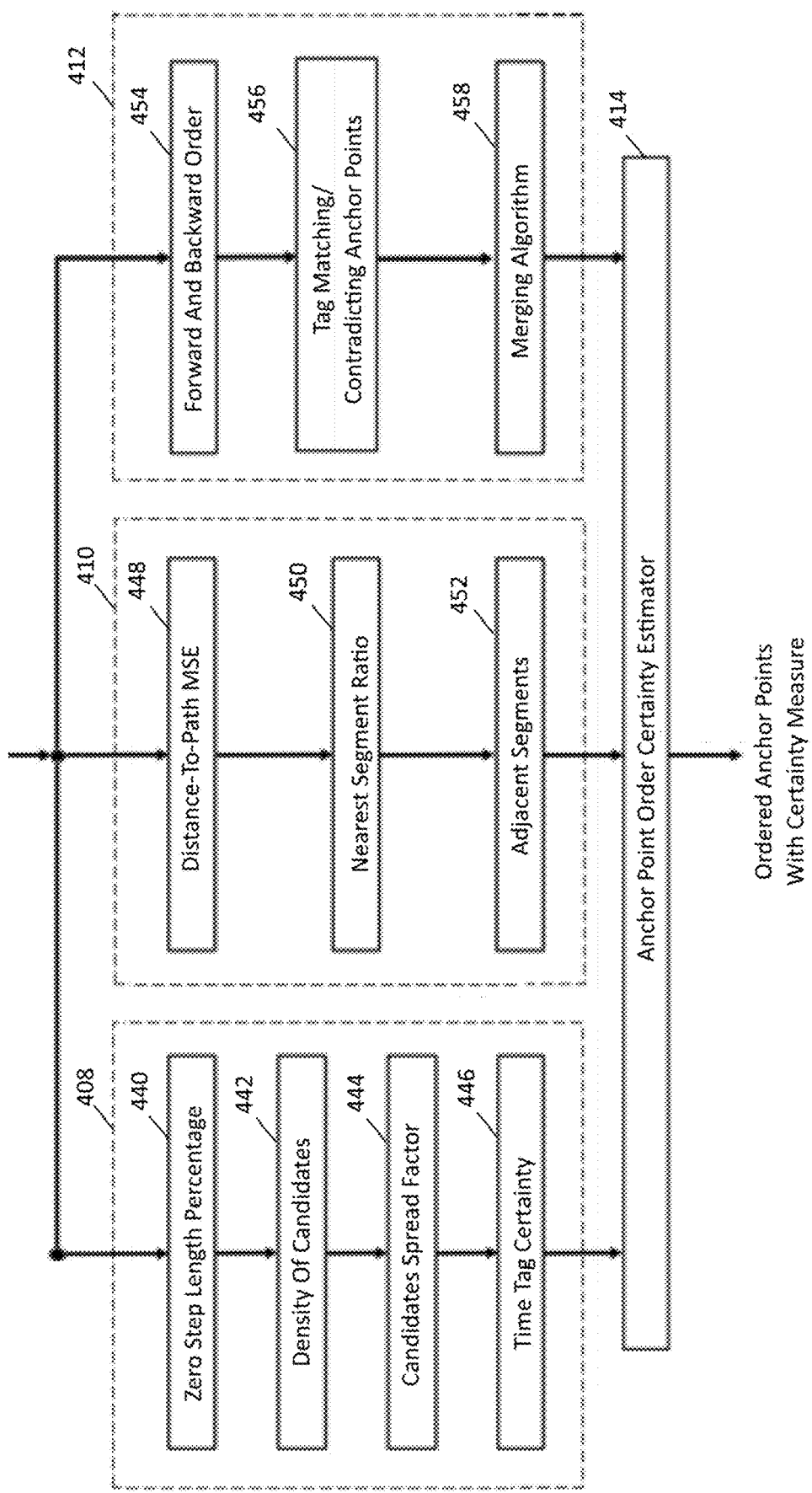
FIG. 21 is a schematic representation of certainty estimation for anchor point ordering according to an embodiment.

To help illustrate aspects of certainty estimation, FIG. 21 schematically depicts the operations of local certainty estimator 408, intermediate certainty estimator 410, global certainty estimator 412 and anchor point order certainty estimator 414. As indicated, local certainty estimator 408 may analyze the segments of the trajectory assigned to each anchor point by considering zero-step length percentage in 440, the density of candidates 442 corresponding to the number of the candidate links representing the segment, the spread of the candidates 444, and the time-tag certainty 446 as obtained from time-tag certainty estimator 420. Depending on the embodiment, other suitable local factors may also be evaluated. In parallel, intermediate certainty estimator 410 may compute the certainty of each anchor point order depending on the mean-square error (MSE) of the distance of the anchor point from the candidate path 448, the nearest trajectory segment ratio 450 and adjacent segments 452 corresponding to the vicinity of the anchor point to other links on the same path. For example, the path MSE may be computed for a forward trajectory and a backward trajectory to provide two optimal paths. Correspondingly, global certainty estimator 412 may use the order from the forward and the order from the backward trajectory to estimate a global certainty measure for the order of each anchor point in 454. Global certainty estimator 412 may also analyze the areas where the order from the forward and backward trajectories concur and/or contradict in 456 and employs merging algorithm 458 to estimate the global certainty for every ordered anchor point.

Using the above techniques, ordered anchor points may aid a map matching operation in multiple aspects. Global optimization algorithm 406 employs a global ordering approach by ensuring that all ordered anchor points are on or close to a physical route on the grid representing the trajectory derived from the navigation solutions. Hence, the number of correctly ordered anchor points may be increased while the number of wrongly ordered anchor points may be decreased as compared to an ordering approach that is driven by local effects. Notably, this may confine the search of the map matching engine by narrowing down possible solutions to paths which pass by the ordered anchor points. Moreover, by estimating the certainty of the order for each anchor point globally, many map matching algorithms may be improved. For example, a threshold of certainty below which certain anchor points are not considered ordered when performing map matching. In addition, by estimating an accurate time-tag and a confidence measure in the time-tag for each ordered anchor point, map matching to generate new hypothesis may be subject to a threshold of certainty before being used as an absolute update.

Figure 22:
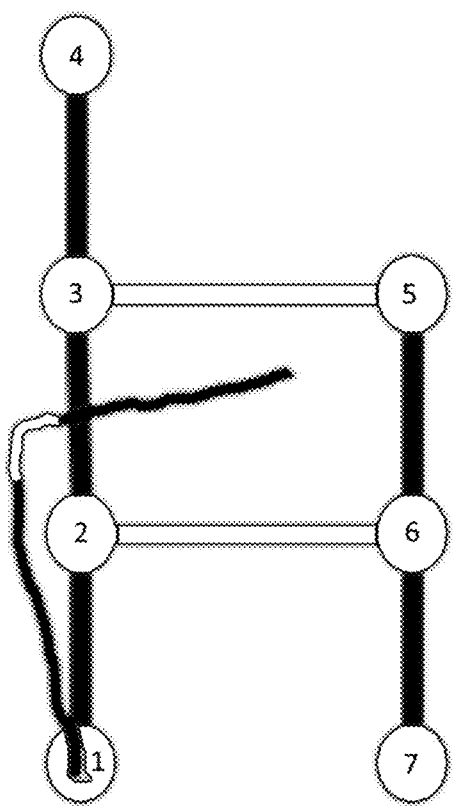
FIG. 22 is a sample trajectory superimposed on a grid map according to an embodiment.

As discussed, candidate generator 404 may provide candidates representing the trajectory travelled by the platform by matching the segmented trajectory derived from the navigation solutions with the grid map at every iteration. The number of candidate links matching a certain segment of the trajectory may be constrained by an empirically preset threshold related to a percentage of the accumulated (travelled) distance per segment. Correspondingly, the direction of the generated candidate may depend on the heading angle of the previous detected turn of the trajectory. For example, identification of turns provides segmentation of the trajectory, each segment of which may be matched to a candidate (a sequence of links) on the grid map. To help illustrate, FIG. 22 shows a sample trajectory with two segments represented by black traces divided by an identified turn, depicted in outline. The sample trajectory is superimposed on top of a grid map in which the nodes are the numbered circles and the links are the connecting straight lines. Correspondingly, this sample trajectory may be seen to represent travel of the platform from node 1 toward nodes 2 or 3, followed by a right hand turn. In this example, candidate generator 404 may produce two candidate links, represented in outline. As shown, one candidate extends from node 2 to node 6 and the other extends from node 3 to node 5.

Figure 23:
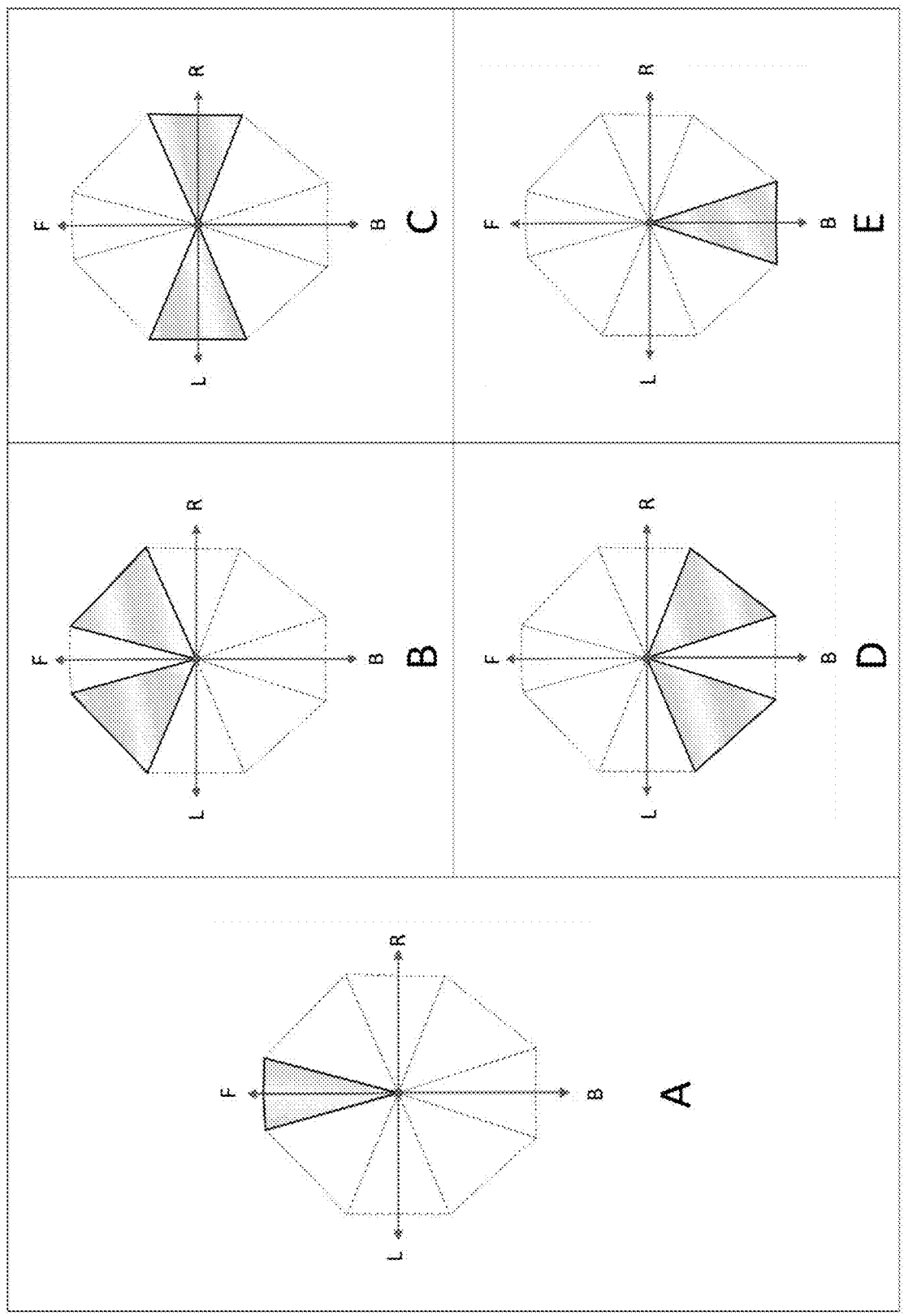
FIG. 23 is a schematic representation of a scenarios for candidate generation according to an embodiment.

Due to the uncertainties and biases of the sensor readings used to generate the trajectory, turns can be miss-detected or over-detected. Correspondingly, turn identification may be evaluated according to five scenarios schematically depicted in FIG. 23. Each cardinal direction is denoted by forward travel (F), backward travel (B), right turn (R) and left turn (L). In general, turns may be detected based on a change of the forward angle ($\Delta\theta$) as noted above, so that the value of ($\Delta\theta$) establishes how candidates may be generated. In scenario A, ($\Delta\theta$) may be located in the shaded region encompassing the F direction, so that candidate generator 404 may produce only forward candidates and no turning candidates. In scenario B, ($\Delta\theta$) may be located in the shaded regions falling between the F direction and the R or L directions. This may indicate ambiguity of whether the trajectory segment is forward or turning, so candidate generator 404 may produce forward candidates as well as turning candidates. In scenario C, ($\Delta\theta$) may be located in the shaded region encompassing either the R or L directions, so that candidate generator 404 may produce only turning candidates and no forward or backward candidates. Next, in scenario D, ($\Delta\theta$) may be located in the shaded regions falling between the B direction and the R or L directions. Since this may also indicate ambiguity, namely whether the trajectory segment is backward or turning, candidate generator 404 may produce backward candidates as well as turning candidates. Finally, in scenario E, (Δθ) may be located in the shaded region encompassing the B direction, so that candidate generator 404 may produce only backward candidates and no turning candidates. A backward candidate accommodates a trajectory segment in which the platform has performed a U-turn.

Candidate generator 404 may also provide candidates representing the trajectory travelled by the platform by assessing any along-track ambiguity corresponding to uncertainty in the length of a trajectory segment. For example, candidates having different numbers of connected nodes corresponding to a trajectory segment may be generated by estimating a distance of the segment. Any suitable technique may be used when assessing the along-track ambiguity, including distance estimations derived from speed of the platform over time, step length accumulation or others.

As will be appreciated from these disclosure materials, the multi-objective function of global optimization algorithm 406 allows for consideration of the trajectory as a whole when ordering anchor points. In comparison, a more local approach to anchor point ordering may give undue weight to an anchor point if it falls on any candidate link, without consideration of whether the candidates are connected or not. Although this produces many ordered anchor points, the percentage of wrongly ordered anchor points may be relatively large. A wrongly ordered anchor point may be more detrimental to map matching than omitting the anchor point from the operation. Moreover, an ordering algorithm focused on a more local analysis may result in an anchor point being assigned to several candidates matched to different segments of the trajectory or more than one anchor point being assigned to different candidates of same segment. To reduce these detrimental effects, global optimization algorithm 406 is constrained so that after generation of all the possible paths from the candidate links matching the segmented trajectory, anchor points may be considered ordered with respect to a specific path if and only if they reside on the path or are within an empirically preset vicinity to the path. The result of this constraint means that only generated paths that closely match the trajectory with respect to the length of the trajectory, the degree of turns and the location of the start and end point of the store are selected as potential paths for ordering the anchor points.

As discussed with reference to FIG. 20, global optimization algorithm 406 includes path generation operation 430 to produce paths composed of the candidate links provided by candidate generator 404. In one embodiment, path generation may include an operation in which the cth candidate link matching segment n of the trajectory may be denoted by $C_n^c$ and is defined by three attributes, (i) the start node id denoted by $st_n^i$, (ii) the end node id denoted by $ed_n^i$ and (iii) the id of the nth segment denoted by $seg_n$. Next, a tree data-structure may be used to store connected candidates depending on their attributes. Each layer of the tree may represent a segment of the trajectory. Then, every $C_n^c$ that does not have an end node that matches the start node of at minimum one of the $C_{n+1}$ candidates may be appended by node 0 and added to the tree. In this embodiment, the zero node id represents the blockage of $C_n^c$. Accordingly, the tree may be used generate all the possible paths, where each path is made up of connected candidates and is denoted by $p_j$.

After generating all possible paths, denoted by P, the goal of global optimization algorithm 406 is to select the path most suited for ordering the anchor points. In other words, among the paths of pool P, it is desirable to select the path closest to the true trajectory. To facilitate this selection, the pool of paths may be culled to exclude paths that may be determined to not represent the trajectory through the use of suitable constraints as indicated by the constraints evaluation operation 432 of FIG. 20. Those paths meeting the constraint(s) may be considered qualified paths that are then subject to scoring using the multi-objective function 434 of global optimization algorithm 406, while unqualified paths may be excluded. Correspondingly, a Qualified Path (QP) may be a path that satisfies one or more minimum requirements to ensure that the path represents the trajectory. Any suitable combination of one or more constraints may be used when identifying QPs.

As one non-limiting example, the constraint used to qualify a path may be based on length. Notably, a QP may be required to meet a minimum and a maximum accumulated distance relative to the trajectory, as paths that are too short or too long should not be considered as QPs. Paths that do not meet this requirement may be short due to a wrong turn followed by a complete blockage because of the grid layout, for example. Therefore, regardless of the trajectory, the grid layout aids in blocking some of the unqualified paths. Furthermore, long paths may be a result of consecutive segments of the TPN trajectory being matched with longer grid candidates. Although these paths are not naturally blocked by the grid, they do not meet the length constrain. A length constraint for the jth path may be expressed as Equation (1):

$$\beta * \Sigma_{n=0}^{N-1} dSeg_n \leq \Sigma_{c \times 0}^{C-1} Cp_c^j \leq (1+\beta) * dSeg_n \quad (1)$$

$\beta|[0 \to 1]$ may be an empirically preset value which defines the acceptable upper and lower ratio between the length of the segments of the trajectory and the length of the candidate links of the jth path. The length of the nth segment of the TPN trajectory is denoted by $dSeg_n$ and the length of the cth candidate of the jth path is denoted by $Cp_c^j$. Moreover, N and C are the total number of segments of the TPN trajectory and the total number of candidates of the jth path respectively.

As another non-limiting example, the constraint used to qualify a path may be based on the starting and ending boundary points of the trajectory. It will be appreciated that every path may be considered as having start and end position on the grid, corresponding to the first and second positions of the trajectory. When considering a forward processed trajectory, the position of the end node may be required to be within a defined circle from the location of the exit node on the grid, which may be known due to characteristics of the venue, such as the location of the exit, the check out registers or the like. Correspondingly, when considering a backward processed trajectory, the position of the end node has to be within a defined circle from the known location of the entrance node on the grid. The constraints for the forward and backward conditions may be represented for the jth path using Equations (2) and (3), respectively:

$$\sqrt{(xe-Xe_{f\text{-}path}^j)^2+(ye-Ye_{f\text{-}path}^j)^2} \leq \varepsilon \quad (2)$$

$$\sqrt{(xs-Xe_{b\text{-}path}^j)^2+(ye-Ye_{b\text{-}path}^j)^2} \leq \varepsilon \quad (3)$$

In both equations, $\varepsilon \in [0,5]$ may be an empirically preset value which defines the acceptable Euclidian distance between the end point of the jth path and the location of the entrance or the exit of the store. The entrance and exit coordinates are denoted by (xs, ys) and (xe, ye) respectively.

Moreover, the end node of the jth forward and backward paths are denoted by $(Xe_{f\text{-}path}^j, Ye_{f\text{-}path}^j)$ and $(Xe_{f\text{-}path}^j, Ye_{f\text{-}path}^j)$ respectively.

Yet another non-limiting example of the constraint used to qualify a path may be based on turns. The grid layout provides only sharp turns such as 90 degrees for a right or left turn and a 180 degrees for a U-turn. However, the TPN trajectory may have either sharp or smooth turns, where each turn is matched to a sharp turn on the grid whenever it is identified as a turn. Correspondingly, a turn-based constraint may qualify a path if the normalized summation of the difference in angles between the detected turns of the trajectory and matched turns on the path are within a preset angle or the number of turns on a QP has to be within an empirically preset threshold of matched turns on the TPN trajectory. For the jth path, the normalized summation of the difference in angles constraint may be expressed as Equation (4):

$$(\pi * \Sigma_{c=0}^{C-1} |t_c^j - t_c|)/(180*C) \leq \gamma \quad (4)$$

$\gamma \in [0 \to 0.25]$ may be an empirically preset value in radians which defines the maximum acceptable difference between the degree of all the turns of the trajectory and the turns of the jth path. The angle of the turn of the cth candidate of the jth path is denoted by $t_c^j$ and the angle of the cth turn of the TPN trajectory is denoted by $t_c$.

Still another non-limiting example of the constraint used to qualify a path may be based on the number of the anchor points that are in sufficient proximity to the path. Given the objective of global optimization algorithm 406 of finding a path from the pool of QPs for use in ordering the anchor points, a path may be required to pass by or be within a sufficient distance of a minimum number of anchor points to be considered as a QP. The measure of anchor point proximity to a candidate of any path may be evaluated the MSE metric, so that the jth path may be evaluated using Equation (5):

$$\Sigma_{m=1}^{M} \mu_m^j \geq \lceil \alpha * M \rceil \quad (5)$$

$\alpha \in [0,1]$ may be an empirically preset value which defines the minimum percentage of anchor points required to be within the vicinity of a path for consideration as a QP. The binary decision variable $\mu_m^j$ represents the mth AP is within the MSE distance from any candidate on the jth path. If the path meets this constraint, the anchor points meeting the MSE distance threshold are assigned to the closest links on the qualified path. All APs that are assigned to links on the jth path are associated with the jth path.

As indicated in FIG. 20, global optimization algorithm 406 evaluates a multi-objective function 434 to score the QPs meeting the constraints evaluation of 432. Every QP may be evaluated to select the path with the maximum score for the ordering process. The multi-objective function may be formulated to establish the cost associated with the QPs using any suitable combination of one or more criteria, including path centered objectives and anchor point objectives as described below.

A path centered objective may be considered as increasing the score of a path as a function of the degree to which it matches the trajectory. This matching can be quantified in terms of number of matched turns or difference in angles between matched turns or both. One non-limiting example of a suitable objective may be related to the degree to which the angle of the turns of the path match the angle of the turns of the trajectory as may be expressed by the weight computed by Equation (6):

$$w_{turns} = \left( \sum_{c=1}^{C-1} e^{-\beta * |t_c^j - t_c|} \right) \Big/ C \quad (6)$$

The exponential relationship of this equation ensures that an increase in the difference between the angles of the turns of the trajectory and the jth path yields a very rapid decrease in the score of the path. The rate of the decay of the exponential function may be determined empirically and controlled by the variable $\beta$. The weight of turns objective denoted by $w_{turns}$ is normalized by C, which is the number of the turns in the jth path. Another non-limiting example of a suitable path centered objective may increase the score of the path as the Euclidian distance decreases between the end point of the path and the exit location of the store (for a forward processed trajectory) or the entrance location of the store (for a backward processed trajectory). This weight given to a path using this objective may be expressed as Equation (7):

$$w_{end} = \frac{1}{(1 + \Delta E^j)} \quad (7)$$

Further, an anchor point centered objective may be one that changes the score of a path depending on factors related to anchor points rather than the path itself. One non-limiting example of a suitable anchor point centered objective maximizes the number of anchor points on a given path while minimizing the MSE of each anchor point, as expressed by the weight $w_{AP}$ computed using Equation (8):

$$w_{AP} = \sum_{m=1}^{M} \mu_m^j * \left( 1 + \frac{1}{\sum_{m=1}^{M} \mu_m^j * mse_m^j} \right) \quad (8)$$

$mse_m^j$ depicts the mean-square error of the distance of the mth AP from the nearest link on the jth path. At the beginning of the trajectory the errors in position may be relatively small compared to the end of the trajectory. Therefore, in order to assign an anchor point to a link of any QP, it may be required to meet a minimum MSE threshold. This threshold may be adaptive as defined by Equation (9):

$$mse_m^j \leq \min(\delta * \log_{10}(1 + seg_n), \delta) \quad (9)$$

$\delta$ is the maximum allowable threshold and may be empirically chosen, while $seg_n$ denotes the id of the nth segment. Another non-limiting example of an anchor point centered objective may increase the score of a path when the time-tag certainty of the anchor points assigned to the path is high. Further details regarding the time-tag and the time-tag certainty estimations are included in the materials that follow. The weight of the time-tag certainties of the APs for the jth path may be denoted by $w_{ttc}$ as calculated using Equation (10):

$$\Sigma_{m=1}^{M} \mu_m^j * ttc_m^j \quad (10)$$

As noted, the multi-objective function employed by global optimization algorithm 406 may a combination of path centered objectives and anchor point objectives. For example, one suitable multi-objective function may be a product of path centered objectives and anchor point centered objectives to balance the weight between both objectives as indicated by Equation (11):

$$Score_{pj} = \alpha * \left( \frac{\sum_{c=1}^{C-1} e^{-\beta*|t_c^j-t_c|}}{C} + \frac{1}{(1+\Delta E^j)} \right) * \\ \left( \sum_{m=1}^{M} \mu_m^j * \left( 1 + \frac{1}{\sum_{m=1}^{M} \mu_m^j * mse_m^j} \right) + \sum_{m=1}^{M} \mu_m^j * ttc_m^j \right) \quad (11)$$

Another suitable multi-objective function to compute the score of a QP may be based on a weighted average between the path centered objectives and the anchor point centered objectives. Depending on the accuracy of the navigation solutions used to derive the trajectory, how optimal the pool of QPs may be and the certainty in the positions of the anchor points, a design parameter α may be employed to give higher weight to certain objectives. An illustration of this approach to provide a weighted average between the path centered objectives and the anchor point centered objectives is represented by Equation (12):

$$Score_{pj} = \alpha * \left( \frac{\sum_{c=1}^{C-1} e^{-\beta*|t_c^j-t_c|}}{C} + \frac{1}{(1+\Delta E^j)} \right) + \\ (1-\alpha) * \left( \sum_{m=1}^{M} \mu_m^j * \left( 1 + \frac{1}{\sum_{m=1}^{M} \mu_m^j * mse_m^j} \right) + \sum_{m=1}^{M} \mu_m^j * ttc_m^j \right) \quad (12)$$

By employing an appropriate multi-objective function, global optimization algorithm 406 may select the path with the highest score for use when ordering the anchor points. Every anchor point may be assigned to a link defined by as two connected nodes on the selected path. The link may be chosen such that the midpoint of the link is required to be the closest to a given anchor point compared to all the other links of the selected path. After applying the ordering process to each anchor point, a desired map matching operation may be performed using the ordered anchor points.

As shown in FIG. 19, the certainty of the order of each anchor point may be assessed. Since using a wrongly ordered anchor point may have a more negative effect on map matching than using an unordered anchor point, it may be desirable to increase the number of ordered anchor points while estimating the certainty of the ordered anchor points. For example, an anchor point with a low certainty order could be regarded as unordered when map matching. In some embodiment, map matching may be configured to be relatively intolerant of ordering errors so that only anchor points with sufficiently high certainty order are used when aiding the map matching process. Specifically, local certainty estimator 408, intermediate certainty estimator 410, global certainty estimator 412 and anchor point order certainty estimator 414 may be employed as described below.

Local certainty estimator 408 may be employed to predict whether an item purchased by the user (thus establishing an anchor point) was during was chosen by the user during the duration of its assigned trajectory segment rather than the order of the anchor point. Local certainty estimator 408 may also be configured to evaluate the number and distribution of candidates representing the segment assigned to an anchor point. Accordingly, estimation of local certainty provides a measure of whether an item corresponding to an anchor point was purchased by the user within the assigned segment duration. As indicated in FIG. 21, local certainty estimator 408 may evaluate measures including zero-step length percentage 440, density of candidates 442, candidate spread factor 444 and time-tag certainty 446.

The evaluation of zero-step length percentage 440 may depend on the number of zero steps within a tunable window around the position of the anchor point on the grid. The position of the anchor point on the grid may be determined and the distance projected to the assigned segment. A window of epochs may be defined around the projected position of the anchor point so that the number of zero-steps within the defined window may be compared to the size of the window as the zero-step length percentage $lc_{zero}^m \in [0,1]$ of the local certainty of the mth AP, expressed by Equation (13):

$$lc_{zero}^m = \frac{Steps_{zero}}{(AP_{time}^m + Wd/2) - (AP_{time}^m - Wd/2)} \quad (13)$$

Wd is the preset window size, $AP_{time}^m$ is the time-tag matched to the projected distance of the anchor point from the grid to the assigned segment and $Steps_{zero}$ denotes the number of zero steps within the window.

Local certainty estimator 408 may also evaluate candidate density 442 to reflect that for every candidate of the selected path, a set of candidates were not chosen. Each segment of the trajectory may be matched to a set of candidates, where the number of candidates C is controlled by several factors, such as the grid layout. As the number of candidates increase, the possibility of an anchor point being assigned to the correct segment decreases. As such, candidate density 442 measures the number of candidates $lc_{num\_cand}^m$ sand matching a trajectory segment as indicated by Equation (14):

$$lc_{num}^m = \min\left(\frac{a}{C}, 1\right) \quad (14)$$

a represents the number of acceptable aisles in error and use of a min function ensures that the measure $lc_{num\_cand}^m$ does not exceed 1.

Furthermore, local certainty estimator 408 may also evaluate the candidate spread factor 444. A candidate selected from a set of matched candidates identified by the density of candidates 442 having a relatively high spread factor may correspond to a relatively lower local certainty, as high spreading of candidates exposes the ordering process to errors, since an anchor point might have been assigned to the wrong segment. The distance between all combinations of the midpoint of all candidates using the function $$dist\left(\frac{C_{midpoint}}{2}\right)$$

may be determined so that the number of acceptable aisles in error a may be multiplied by the width of an aisle and divided by the maximum distance between the midpoint of the two candidates to compute the candidate spread factor $lc_{SF}^m$ according to Equation (15):

$$lc_{SF}^m = (a*\text{width}_a)/\max\left(dist\left(\frac{c_{midpoint}}{2}\right)\right) \quad (15)$$

As indicated in FIG. 21, local certainty estimator 408 may also employ the time-tag certainty 446 as obtained from time-tag certainty estimator 420.

Local certainty estimator 408 may provide a certainty for the anchor points using any suitable combination of one or more of the above factors or others. The effect of each factor may depends on how the candidates are initially matched as well as the accuracy of the trajectory. In one embodiment, a suitable measure of local certainty may be given by Equation (16), where $w_{zero}$, $w_{num}$, $w_{SF}$ and $w_{tt}$ are weights for local certainty measures zero-step length percentage 440, density of candidates 442, candidate spread factor 444 and time-tag certainty 446, respectively:

$$lc^m = \min((w_{zero}*lc_{zero}^m + w_{num}*lc_{num}^m + w_{SF}*lc_{SF}^m + w_{tt}*lc_{tt}^m), 1) \quad (16)$$

As noted above, local certainty estimator 408 may provide a measure of whether an item corresponding to an anchor point was purchased by the user within the assigned segment duration rather than the order of the anchor point. Correspondingly, intermediate certainty estimator 410 may provide a broader view of the path. To this end, the distance to path measure 448 may correspond to the distance of the mth anchor point, denoted by $dist^m$, from the assigned candidate of the selected path. As will be appreciated, an anchor point associated with a path may fall on the path or within a sufficient distance from the path. The nearest segment ratio 450 may represent the closeness of the anchor point from the second closest candidate denoted by $dist_{closest}^m$. The $ic^m$ is inversely proportional to the distance of the anchor point from the second closest candidate of the selected path. In one embodiment, a weighted average of these measures may be used as indicated by Equation (17):

$$ic^m = \min\left(\frac{\text{width}_a}{2*\max(dist^m, \text{width}_a)}, \frac{1}{2}\right) + \min\left(\frac{dist_{closest}^m}{2*\text{width}_a}, \frac{1}{2}\right) \quad (17)$$

Intermediate certainty estimator 410 may also evaluate the adjacent segments measure 452, which studies the distribution of segments around an anchor point assigned to a link on a QP path, when determining $ic^m$.

Figure 24:
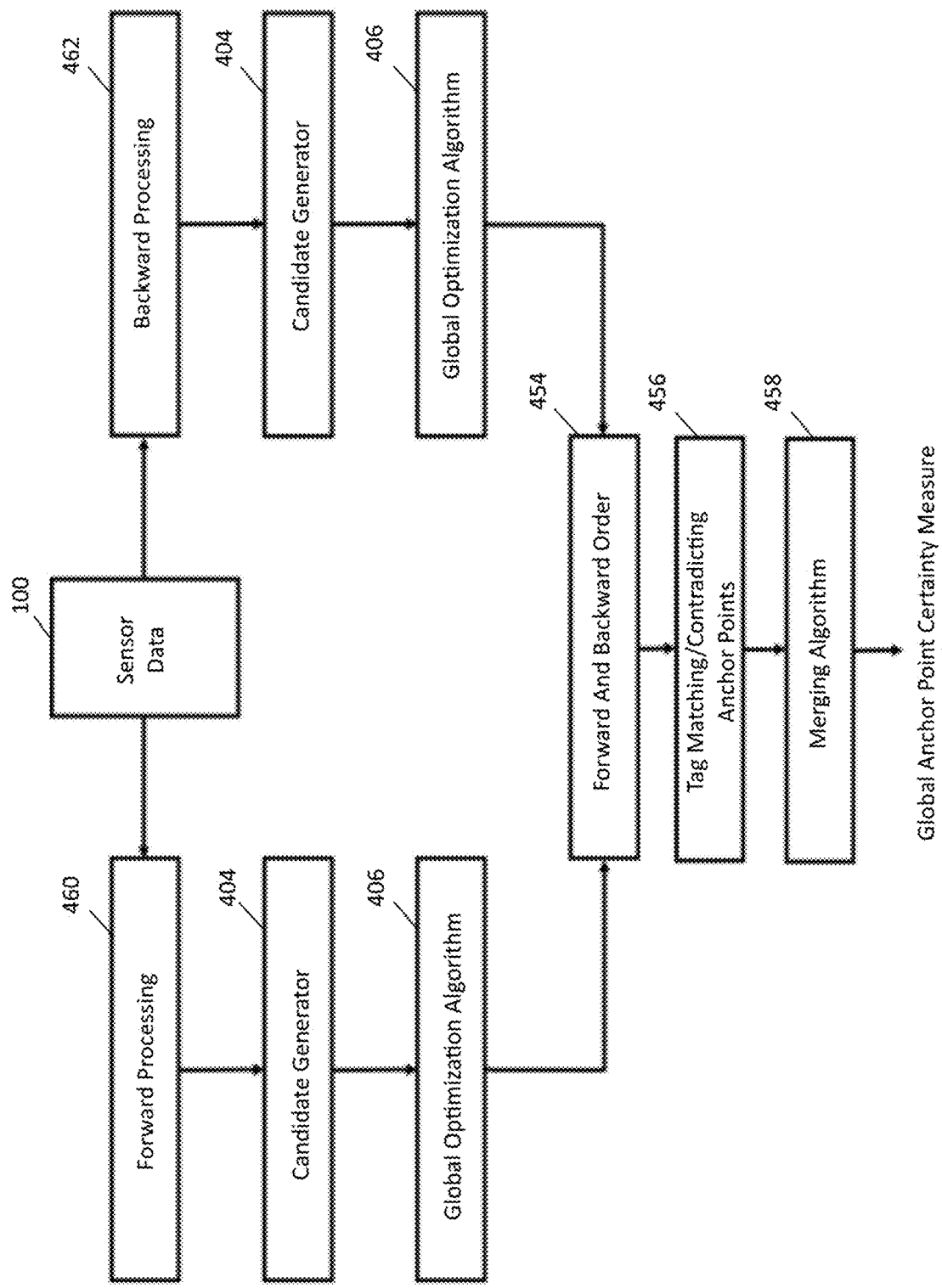
FIG. 24 is a schematic representation of estimating global anchor point ordering certainty according to an embodiment.

Global certainty estimator 412 may estimate the correctness of the overall order of the anchor points by processing the trajectory in the forward and backward direction 454 as indicated by FIG. 21. Forward processing and backward processing of the sensor data results in two distinct trajectories. Correspondingly, global certainty estimator 412 may take advantage of two different sources of information. Further details regarding one exemplary architecture of global certainty estimator 412 is schematically depicted in FIG. 24. Sensor data may be obtained in 100, as described in reference to FIG. 4 and forward processed in 460 and backward processed in 462. The resulting outputs are fed to candidate generator 404 for use by global optimization algorithm 406, as described in reference to FIG. 19, for which a path is selected for each to order the anchor points. Thus, the outputs of global optimization algorithm 406 are the anchor points as ordered using the forward processing and backward processing. As noted above with regard to FIG. 22, the forward and backward ordered anchor points are compared in 454. Tagging matching and contradicting anchor point orders in 456 results in one subset of anchor points that have the same order in both the forward and backward paths. Another subset of anchor points that exist in both the forward path and backward path, but have different orders. Yet another subset may contain those anchor points that are either on the forward path or backward path but not both. Merging algorithm 458 may be configured to increase the certainty of the anchor points correctly ordered by both forward and backward paths, while decreasing the certainty of those anchor points that have different order or exist only on one of the paths. The amount of decrease in certainty for anchor points having different orders may depend on the amount of shift between the forward and backward paths.

As will be appreciated, the ordered anchor points may be employed to aid a map matching operation by constraining the number of possible paths to a more manageable number. Notably, map matching may be aided by providing each anchor point with a time-tag as indicated by 418 in FIG. 19. The map matching process may then generate new hypotheses or absolute updates by correlating the time-tagged anchor points with the appropriate segments of the trajectory to enhance the solution. Moreover, the certainty of the assigned time-tags may be estimated to minimize the use of incorrect information during map matching.

Figure 25:
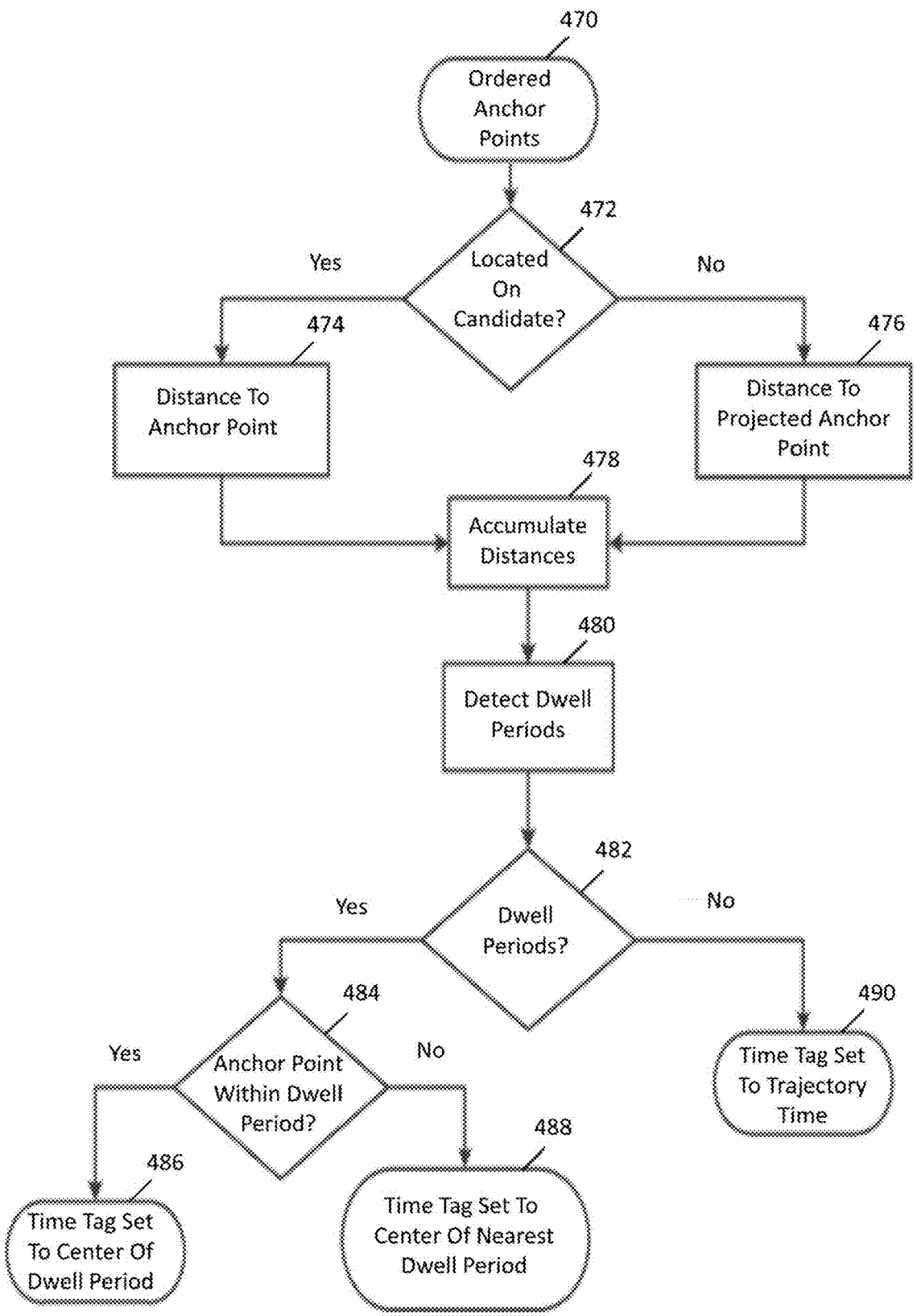
FIG. 25 is a schematic representation of a routine for assigning time-tags to ordered anchor points according to an embodiment.

One suitable routine for assigning time-tags to ordered anchor points is schematically depicted by the flowchart of FIG. 25. Beginning with 470, the ordered anchor points may be obtained from global optimization algorithm 406. In 472, each anchor points is evaluated to determine whether it falls on a candidate link of the selected path. The distance of each anchor point falling on a candidate along the candidate is determined in 474. Alternatively, the anchor point is projected onto the assigned candidate for each anchor point that does not fall on a candidate link, so that the distance along the assigned candidate to the projected anchor point may be determined in 476. The time-tag corresponding to the mth anchor point on the trajectory segment may be denoted $TT_{tpn}^m$. The distances determined in 474 and 476 are accumulated along the appropriate trajectory segment in 478. In 480, the starting and ending epochs of a dwell are detected to establish the dwell periods. In 482, the routine branches depending on whether any dwell periods are detected. When dwell periods are identified, a determination is made whether the $TT_{tpn}^m$ for a given anchor point is within one of the dwell periods in 484. If so, the anchor point is given a refined time-tag, denoted by $TT_{AP}^m$, is shifted to the center of the dwell period in 486. Otherwise, the time-tag $TT_{AP}^m$ is assigned to the time-tag of the center of the closest dwell period in 488. When no dwell periods are identified in 482, the time-tag $TT_{AP}^m$ is set to equal $TT_{tpn}^m$ in 490.

Figure 26:
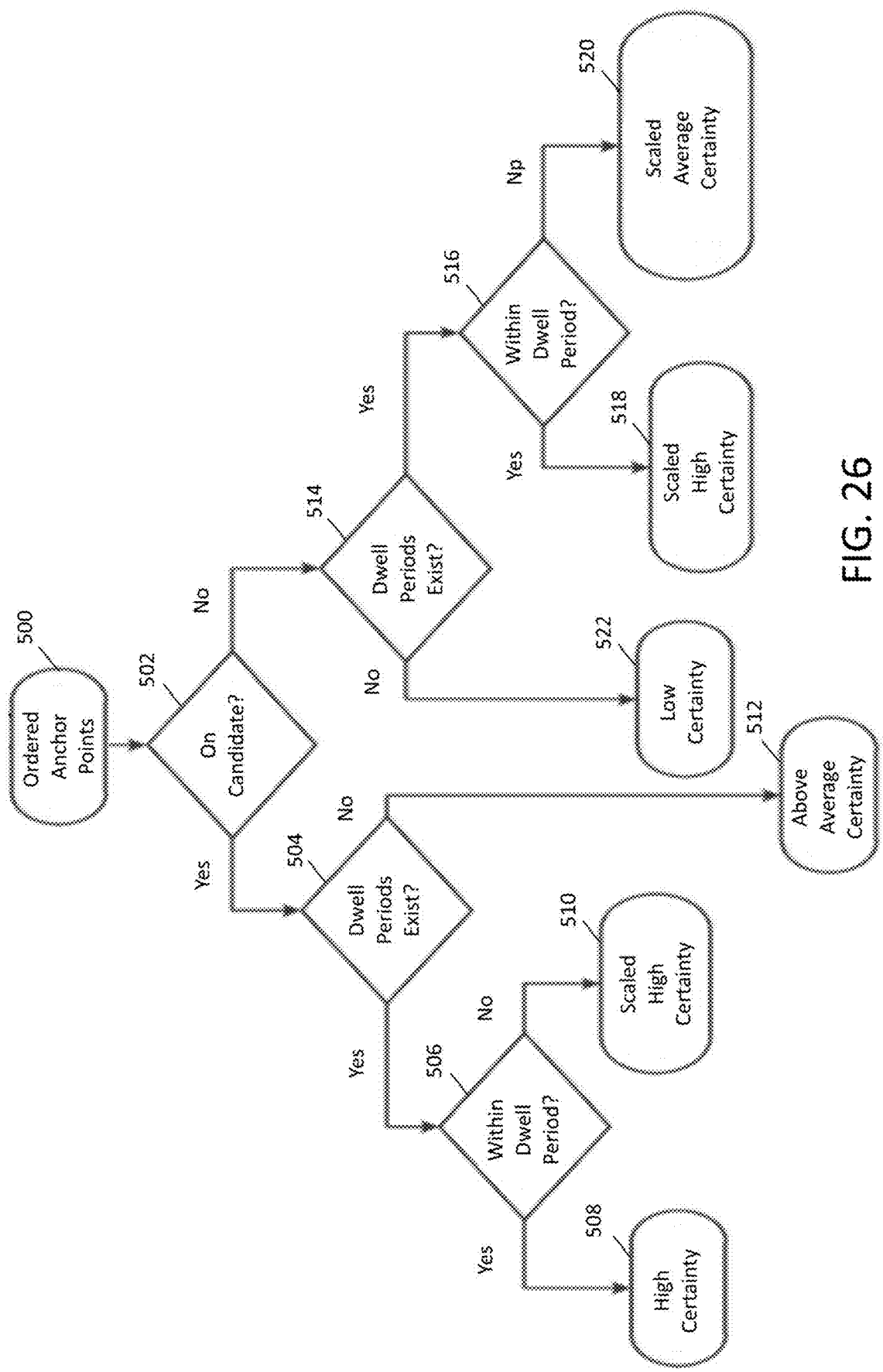
FIG. 26 is a schematic representation of a routine for estimating certainty for time-tags assigned to ordered anchor points according to an embodiment.

Following the assignment of time-tags by time-tag estimator 418, a certainty for each time-tag may be determined by time-tag certainty estimator 420 as also shown in FIG. 19. One suitable routine for determining time-tag certainty is schematically depicted in the flowchart of FIG. 26. Beginning with 500, the ordered anchor points may be obtained from global optimization algorithm 406. In 502, each anchor points is evaluated to determine whether it falls on a candidate link of the selected path. For candidates falling on a candidate, the routine branches to 504 for a determination of whether any dwell periods have been identified. If dwell periods exist, a determination is made whether the time-tag of the anchor point occurs within an identified dwell period in 506. If so, the time-tag for the anchor point may be accorded a relatively high certainty in 508. If the anchor point does not occur within an identified dwell period, it may be accorded a relatively high certainty that is scaled down depending on the difference in time from the time-tag to the nearest detected dwell period in 510. If no dwell periods are detected in 504, the corresponding anchor point may be accorded an above average certainty in 512. For anchor points that do not fall on a candidate link, a similar determination regarding the existence of dwell periods is made in 514. If dwell periods exist, a determination is made whether the time-tag of the anchor point occurs within an identified dwell period in 516. If so, the time-tag for the anchor point may be accorded a relatively high certainty in 518 that is scaled down depending on the perpendicular distance of the anchor point to the candidate link. If the anchor point does not occur within an identified dwell period, it may be accorded a average certainty that is scaled down depending on depending on the perpendicular distance of the anchor point to the candidate link and on the relative time to the time-tag of the nearest detected dwell period in 520. If no dwell periods are detected in 504, the corresponding anchor point may be accorded an above average certainty in 512. When the anchor point is not on a candidate and no dwell periods exist in 514, the routine flows to 522 to accord the anchor point a relatively low certainty. As discussed above, anchor points having time-tags with relatively high certainties may be used during map matching to create new forward or backward hypotheses, or used as absolute updates, while anchor points with relatively low certainties may be used to weight existing hypotheses.

As will be appreciated, the global optimization algorithm 406 of this disclosure represents a formulation of a constrained global multi-objective function that may be used for ordering anchor points. The output of the algorithm is a set of ordered anchor points that may be used when map matching. Although such ordered anchor points may aid any suitable map matching process, certain representative embodiments are discussed in co-pending, commonly-assigned U.S. patent application Ser. No. 15/385,412, filed Dec. 20, 2016 and entitled "METHOD AND SYSTEM FOR GLOBAL SHAPE MATCHING A TRAJECTORY," which describes the enhancement of a positioning/navigation solution of a portable device by obtaining motion sensor data, estimating a trajectory for the portable device from the motion sensor data, obtaining map information for an environment encompassing locations of the portable device, representing the estimated trajectory using a set of connected vectors and performing global shape matching for the set of connected vectors as an aggregate whole from start to end of the trajectory to the map information as a global optimization problem to derive a solution path and is incorporated by reference in its entirety.

Depending on the architecture of device 100, sensor processor 108 and inertial sensor 112 may be formed on different chips, or as shown, may reside on the same chip. A sensor fusion algorithm employed to calculate the orientation of device 100 may be performed externally to sensor processor 108 and MPU 106, such as by host processor 104, or may be performed by MPU 106. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits.

One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

CONTEMPLATED EMBODIMENTS

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated navigation solution in the device integrating the available sensors with the absolute navigation information (e.g. GNSS) and possibly with the optional speed or velocity readings; or a backward smoothed integrated navigation solution integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map aided or model aided routine. Map aided or model aided can further enhance the navigation solution during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for ordering a plurality of anchor points based at least in part on a navigation solution from a portable device, wherein the mobility of the portable device is constrained or unconstrained within a platform and wherein the portable device may be tilted to any orientation, the method comprising:
    a) obtaining motion sensor data for the portable device representing motion of the portable device at a plurality of epochs over a first period of time;
    b) deriving a trajectory for the portable device for the first period of time based at least in part on the obtained motion sensor data, wherein the motion sensor data comprises data from at least one inertial sensor;
    c) obtaining a map of a venue encompassing the trajectory;
    d) obtaining at a time subsequent to the first period of time a plurality of temporally unordered anchor points associated with the trajectory, wherein the unordered anchor points are derived from point of sale information;
    e) associating known positions of the plurality of anchor points with the map;
    f) characterizing turns of the trajectory;
    g) representing the trajectory as a set of connected segments, such that each segment is defined by adjacent turns;
    h) generating candidate links for each segment by comparing each segment to the map;
    i) deriving possible paths for the trajectory from the candidate links;
    j) scoring each derived possible path with a multi-objective function;
    k) selecting a solution path from the derived possible paths based at least in part on the scores; and
    l) ordering the plurality of anchor points temporally based at least in part on the solution path, so that the plurality of anchor points are temporally ordered based at least in part on the obtained motion sensor data.

2. The method of claim 1, further comprising transforming the obtained map into a grid of connected traces and nodes.

3. The method of claim 1, wherein characterizing turns of the trajectory comprises identifying a rate of change in heading exceeding a threshold, wherein the rate of change in heading is calculated from gyroscope data.

4. The method of claim 1, wherein characterizing turns of the trajectory comprises identifying a change in heading exceeding a threshold, wherein the change in heading is calculated from determined positions of the portable device.

5. The method of claim 1, wherein generating candidate links for each segment comprises assessing an angle associated with a heading change and generating at least one candidate link based on the angle.

6. The method of claim 1, wherein generating candidate links for each segment comprises assessing a distance traveled associated with each segment and generating at least one candidate for that segment based on the distance traveled.

7. The method of claim 1, wherein deriving possible paths for the trajectory comprises connecting a combination of the candidate links for each possible path.

8. The method of claim 7, wherein deriving possible paths for the trajectory further comprises ensuring each possible path meets a constraint.

9. The method of claim 8, wherein the constraint is selected from the group consisting of:
    (i) requiring an accumulated length of a connected combination of the candidate links to be within a threshold of a distance associated with the derived trajectory;
    (ii) requiring a boundary point of a connected combination of the candidate links to be within a threshold distance of an boundary point of the derived trajectory;
    (iii) requiring a summation of angle differences between turns of a connected combination of the candidate links and corresponding identified turns of the derived trajectory to be within a threshold angle;
    (iv) requiring a number of turns of a possible path that match identified turns of the derived trajectory to be within a threshold percentage; and
    (v) requiring a threshold percentage of the plurality of anchor points to be within a defined distance of a connected combination of the candidate links.

10. The method of claim 1, wherein the multi-objective function comprises a combination of one or more objectives selected from the group consisting of:
    (i) an objective that reduces angle differences between turns of a connected combination of the candidate links and the corresponding identified turns of the derived trajectory;
    (ii) an objective that increases a number of turns of a possible path that match identified turns of the derived trajectory,
    (iii) an objective that reduces a distance between a boundary point of a possible path and a boundary point of the derived trajectory, (iv) an objective that increases a number of anchor points associated with a possible path and decreases a distance between each anchor point and the possible path, and
(v) an objective that weights a number of anchor points associated with a possible path at least in part on a time-tag certainty for each anchor point.

11. The method of claim 10, wherein time-tag certainty for an anchor point is determined by estimating a time-tag for the anchor point based at least in part on a distance of the anchor point along the trajectory and whether the estimated time-tag is associated with a dwell period.

12. The method of claim 1, further comprising estimating a certainty for each anchor point of the ordered plurality of anchor points.

13. The method of claim 12, wherein estimating the certainty of the ordered plurality of anchor points comprises performing a local estimation based on at least one of:
 (i) zero-step length percentage;
 (ii) candidates spread factor;
 (iii) candidate density; and
 (iv) time-tag certainty.

14. The method of claim 12, wherein estimating the certainty of the ordered plurality of anchor points comprises performing an intermediate estimation based on at least one of (i) distances between the solution path and anchor points that are associated with the solution path, (ii) nearest segment ratio, and (iii) adjacent segments.

15. The method of claim 12 wherein estimating the certainty of the ordered plurality of anchor points comprises performing a global estimation based on at least one of (i) forward and backward order, (ii) anchor point time-tags, and (iii) merging of forward and backward order.

16. The method of claim 12, wherein estimating the certainty of the ordered plurality of anchor points comprises performing a local estimation, an intermediate estimation and a global estimation.

17. The method of claim 1, further comprising assigning a time-tag for at least one of the ordered plurality of anchor points.

18. The method of claim 17, wherein assigning the time-tag is based at least in part on a factor selected from the group consisting of: (i) whether an anchor point falls on a candidate link and (ii) a relationship of an anchor point to a dwell period.

19. The method of claim 17, further comprising estimating a certainty for the assigned time-tag.

20. The method of claim 19, wherein estimating the certainty for the assigned time-tag is based at least in part on a factor selected from the group consisting of: (i) whether an anchor point falls on a candidate link and (ii) a relationship of an anchor point to a dwell period.

21. The method of claim 1, wherein deriving a trajectory for the portable device comprises one or more of the following:
 (i) a forward processing operation over the first period of time;
 (ii) a backward processing operation over the first period of time;
 (iii) a forward processing operation and a backward processing operation over the first period of time;
 (iv) a forward processing operation, a backward processing operation over the first period of time, and a combination of the forward processing and backward processing;
 (v) a smoothing operation over the first period of time;
 (vi) a backward smoothing operation over the first period of time; and
 (vii) a multiple pass processing operation over the first period of time.

22. A system for ordering a plurality of anchor points comprising:
 a) a portable device comprising an integrated sensor assembly, configured to output motion sensor data for the portable device representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation, and a communications module for transmitting information corresponding to the epochs; and
 b) remote processing resources configured to receive the information from the portable device and having a processor configured to implement an ordering module to:
 i) obtain a map of a venue encompassing a trajectory derived for the portable device from the sensor data for the first period of time;
 ii) obtain at a time subsequent to the first period of time a plurality of temporally unordered anchor points associated with the trajectory, wherein the unordered anchor points are derived from point of sale information;
 iii) associate known positions of the plurality of anchor points with the map;
 iv) characterize turns of the trajectory;
 v) represent the trajectory as a set of connected segments, such that each segment is defined by adjacent turns;
 vi) generate candidate links for each segment by comparing each segment to the map;
 vii) derive possible paths for the trajectory from the candidate links;
 viii) score each derived possible path with a multi-objective function;
 ix) select a solution path from the derived possible paths based at least in part on the scores; and
 x) order the plurality of anchor points temporally based at least in part on the solution path, so that the plurality of anchor points are temporally ordered based at least in part on the motion sensor data.

23. The system of claim 22, wherein the information received by the remote processing resources comprises sensor data for the portable device and wherein the ordering module is further configured to derive the trajectory based at least in part on the sensor data.

24. The system of claim 22, wherein the portable device further comprises a navigation module configured to derive the trajectory based at least in part on the sensor data at the plurality of epochs and wherein the communications module transmits the trajectory.

25. A remote processing resource for ordering a plurality of anchor points, the remote processing resource configured to implement an ordering module to:
 a) obtain a map of a venue encompassing a trajectory derived for a portable device from motion sensor data representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation;

b) obtain at a time subsequent to the first period of time a plurality of temporally unordered anchor points associated with the trajectory, wherein the unordered anchor points are derived from point of sale information;
c) associate known positions of the plurality of anchor points with the map;
d) characterize turns of the trajectory;
e) represent the trajectory as a set of connected segments, such that each segment is defined by adjacent turns;
f) generate candidate links for each segment by comparing each segment to the map;
g) derive possible paths for the trajectory from the candidate links;
h) score each derived possible path with a multi-objective function;
i) select a solution path from the derived possible paths based at least in part on the scores; and
j) order the plurality of anchor points temporally based at least in part on the solution path, so that the plurality of anchor points are temporally ordered based at least in part on the motion sensor data.

26. The remote processing resource of claim 25, wherein the remote processing resource receives sensor data for the portable device for the plurality of epochs and wherein the ordering module is further configured to derive the trajectory based at least in part on the sensor data.

27. The remote processing resource of claim 25, wherein the remote processing resource receives the trajectory based at least in part on the sensor data at the plurality of epochs from the portable device.

28. The remote processing resource of claim 25, wherein the remote processing resource is part of a system that further comprises a portable device for ordering a plurality of anchor points comprising:
an integrated sensor assembly, configured to output sensor data for the portable device representing motion of the portable device at a plurality of epochs over the first period of time, wherein the mobility of the portable device is constrained or unconstrained within a platform and wherein the portable device may be tilted to any orientation, and a communications module for transmitting information corresponding to the epochs.

29. A portable device for ordering a plurality of anchor points comprising:
a) an integrated sensor assembly, configured to output motion sensor data for the portable device representing motion of the portable device at a plurality of epochs over a first period of time, wherein the motion sensor data comprises data from at least one inertial sensor, wherein the mobility of the portable device is constrained or unconstrained within a platform and wherein the portable device may be tilted to any orientation, and a communications module for transmitting information corresponding to the epochs; and
b) a navigation module configured to:
i) derive a trajectory for the portable device for the first period of time based at least in part on the sensor data;
ii) obtain a map of a venue encompassing the trajectory;
iii) obtain at a time subsequent to the first period of time a plurality of temporally unordered anchor points associated with the trajectory, wherein the unordered anchor points are derived from point of sale information;
iv) associate known positions of the plurality of anchor points with the map;
v) characterize turns of the trajectory;
vi) represent the trajectory as a set of connected segments, such that each segment is defined by adjacent turns;
vii) generate candidate links for each segment by comparing each segment to the map;
viii) derive possible paths for the trajectory from the candidate links;
ix) score each derived possible path with a multi-objective function;
x) select a solution path from the derived possible paths based at least in part on the scores; and
xi) order the plurality of anchor points temporally based at least in part on the solution path, so that the plurality of anchor points are temporally ordered based at least in part on the motion sensor data.

30. The portable device of claim 29, wherein the sensor assembly includes an accelerometer and a gyroscope.

* * * * *